United States Patent
Gupta et al.

(10) Patent No.: US 11,734,942 B2
(45) Date of Patent: *Aug. 22, 2023

(54) BIOMETRIC KEY INCLUDING A TEXTURED CERAMIC COVER

(71) Applicant: Apple Inc., Cupertino, CA (US)

(72) Inventors: Vivek Gupta, Fremont, CA (US); Nicholas A. Renda, San Francisco, CA (US); Chi Xu, Santa Clara, CA (US); Stephen V. Jayanathan, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,952

(22) Filed: Aug. 31, 2021

(65) Prior Publication Data

US 2021/0397808 A1   Dec. 23, 2021

Related U.S. Application Data

(63) Continuation of application No. 16/812,297, filed on Mar. 7, 2020, now Pat. No. 11,113,494.

(60) Provisional application No. 62/933,839, filed on Nov. 11, 2019.

(51) Int. Cl.
*G06V 40/13* (2022.01)
*G02B 1/115* (2015.01)

(52) U.S. Cl.
CPC ............. *G06V 40/13* (2022.01); *G02B 1/115* (2013.01)

(58) Field of Classification Search
CPC . G06K 9/00013; G06K 9/00087; G02B 1/115
See application file for complete search history.

(56) References Cited

U.S. PATENT DOCUMENTS

| | | | |
|---|---|---|---|
| 2,942,383 A | 6/1960 | Brown et al. |
| 3,091,060 A | 5/1963 | Giegerich et al. |
| 3,094,814 A | 6/1963 | Barke et al. |
| 3,131,515 A | 5/1964 | Mason |
| 3,453,097 A | 7/1969 | Hafner |
| 3,535,159 A | 10/1970 | Shiro |

(Continued)

FOREIGN PATENT DOCUMENTS

| | | |
|---|---|---|
| CN | 1976778 | 6/2007 |
| CN | 1978167 | 6/2007 |

(Continued)

OTHER PUBLICATIONS

Cho et al., "A Black Metal-dielectric Thin Film for High-contrast Displays," Journal of the Korean Physical Society, vol. 55, No. 2, pp. 501-507, Aug. 2009.

*Primary Examiner* — Omar S Ismail
(74) *Attorney, Agent, or Firm* — Brownstein Hyatt Farber Schreck, LLP

(57) ABSTRACT

An electronic device is provided, the electronic device having a keyboard including a biometric input device. The biometric input device may be a biometric key or button. A cap of a biometric key or button may include a textured ceramic cover, such as a textured sapphire cover. The cap may further include a rear decorative coating and a front antireflective coating disposed on or over the textured ceramic cover. The cap may have one or more visual and or tactile properties which resemble those of an adjacent key of the keyboard.

20 Claims, 12 Drawing Sheets

(56) References Cited

U.S. PATENT DOCUMENTS

| | | | |
|---|---|---|---|
| 3,699,719 A | 10/1972 | Rozdilsky et al. | |
| 3,848,363 A | 11/1974 | Lovness et al. | |
| 3,855,441 A | 12/1974 | Kimmelmann | |
| 3,885,943 A | 5/1975 | Chui | |
| 4,122,602 A | 10/1978 | Sastri et al. | |
| 4,343,111 A | 8/1982 | Inoue | |
| 4,467,168 A | 8/1984 | Morgan | |
| 4,524,543 A | 6/1985 | Inoue | |
| 4,682,003 A | 7/1987 | Minakawa | |
| 4,806,731 A | 2/1989 | Bragard et al. | |
| 4,861,620 A | 8/1989 | Azuma et al. | |
| 5,185,957 A | 2/1993 | Mizuguchi et al. | |
| 5,187,899 A | 2/1993 | Rhoades | |
| 5,230,182 A | 7/1993 | Daniell et al. | |
| 5,303,510 A | 4/1994 | Calkins | |
| 5,384,989 A | 1/1995 | Shibano | |
| 5,404,680 A | 4/1995 | Mizuguchi et al. | |
| 5,776,355 A | 7/1998 | Martin et al. | |
| 5,836,249 A | 11/1998 | Chatterjee et al. | |
| 5,857,901 A | 1/1999 | LaPoint | |
| 5,957,753 A | 9/1999 | Komanduri et al. | |
| 6,198,070 B1 | 3/2001 | Nakayama et al. | |
| 6,376,797 B1 | 4/2002 | Piwczyk et al. | |
| 6,413,619 B1 | 7/2002 | Hamada et al. | |
| 6,562,698 B2 | 5/2003 | Manor | |
| 6,580,054 B1 | 6/2003 | Liu et al. | |
| 6,612,906 B2 | 9/2003 | Benderly | |
| 6,670,571 B2 | 12/2003 | Dance et al. | |
| 6,746,724 B1 | 6/2004 | Robertson et al. | |
| 6,899,798 B2 | 5/2005 | Weldon et al. | |
| 7,208,401 B2 | 4/2007 | Nelson et al. | |
| 7,512,297 B2 | 3/2009 | Farah | |
| 7,514,291 B2 | 4/2009 | Akram | |
| 7,664,469 B2 | 2/2010 | Hutchison | |
| 7,741,579 B2 | 6/2010 | Lambert et al. | |
| 7,803,451 B2 | 9/2010 | Lee et al. | |
| 7,838,796 B2 | 11/2010 | Furui | |
| 7,966,785 B2 | 6/2011 | Zadesky et al. | |
| 8,016,644 B2 | 9/2011 | Curodeau et al. | |
| 8,408,972 B2 | 4/2013 | Kenney | |
| 9,120,179 B2 | 9/2015 | Richter et al. | |
| 9,790,126 B2* | 10/2017 | Matsuyuki | C03C 17/3639 |
| 9,844,833 B2* | 12/2017 | Li | B23K 26/402 |
| 10,144,107 B2 | 12/2018 | Kamireddi et al. | |
| 10,402,617 B2 | 9/2019 | Cao et al. | |
| 2002/0063361 A1 | 5/2002 | Fahey et al. | |
| 2007/0132153 A1 | 6/2007 | Aiyer et al. | |
| 2007/0284785 A1 | 12/2007 | Hoekstra | |
| 2009/0275157 A1* | 11/2009 | Winberg | H01L 33/20 257/E21.214 |
| 2009/0275266 A1* | 11/2009 | Winberg | H01L 33/58 451/36 |
| 2011/0003535 A1 | 1/2011 | Perez-Duarte | |
| 2012/0242698 A1* | 9/2012 | Haddick | G06Q 30/02 345/633 |
| 2012/0249797 A1* | 10/2012 | Haddick | G04G 21/04 701/491 |
| 2012/0328905 A1* | 12/2012 | Guo | B23K 26/0006 428/141 |
| 2015/0146944 A1* | 5/2015 | Pi | H04L 63/0861 382/124 |
| 2015/0296607 A1* | 10/2015 | Yang | H05K 1/167 361/749 |
| 2016/0293780 A1* | 10/2016 | Mizuno | H01L 31/0232 |
| 2017/0032169 A1 | 2/2017 | Pi et al. | |
| 2017/0059746 A1* | 3/2017 | Tung | G06F 3/0443 |
| 2017/0091515 A1* | 3/2017 | Cao | H05K 5/0086 |
| 2017/0109561 A1* | 4/2017 | Wyrwas | G06V 40/1329 |
| 2017/0161544 A1* | 6/2017 | Fomani | G06V 40/1359 |
| 2017/0176246 A1* | 6/2017 | Jia | G01J 1/0271 |
| 2017/0184764 A1 | 6/2017 | Matsuyuki et al. | |
| 2017/0255275 A1* | 9/2017 | Demenschonok | G06F 1/1662 |
| 2017/0330012 A1* | 11/2017 | Salvia | G06F 1/3231 |
| 2018/0081086 A1* | 3/2018 | Wang | G02B 1/18 |
| 2018/0196982 A1* | 7/2018 | Panchawagh | G06V 40/1353 |
| 2018/0329560 A1 | 11/2018 | Kim et al. | |
| 2019/0050618 A1* | 2/2019 | Khuri-Yakub | A61B 5/14552 |
| 2019/0050619 A1 | 2/2019 | Kern et al. | |
| 2019/0130083 A1* | 5/2019 | Agassy | G06V 40/1347 |
| 2019/0369294 A1 | 12/2019 | Chang et al. | |
| 2020/0096686 A1 | 3/2020 | Cool et al. | |
| 2021/0142030 A1 | 5/2021 | Gupta et al. | |

FOREIGN PATENT DOCUMENTS

| | | |
|---|---|---|
| JP | 2001210905 | 8/2001 |
| JP | 2010239157 | 10/2010 |
| TW | 422751 | 2/2001 |
| TW | M438642 | 10/2012 |
| WO | WO2006038152 | 4/2006 |
| WO | WO2011037167 | 3/2011 |

* cited by examiner

BIOMETRIC KEY INCLUDING A TEXTURED CERAMIC COVER

CROSS-REFERENCE TO RELATED APPLICATION(S)

This application is a continuation patent application of U.S. patent application Ser. No. 16/812,297, filed Mar. 7, 2020 and titled "Biometric Key Including a Textured Ceramic Cover," which is a nonprovisional patent application of and claims the benefit of U.S. Provisional Patent Application No. 62/933,839, filed Nov. 11, 2019 and titled "Biometric Key Including a Textured Ceramic Cover," the disclosures of which are hereby incorporated herein by reference in their entireties.

FIELD

The described embodiments relate generally to electronic devices including a biometric input device, such as a biometric key or button. More particularly, the present embodiments relate to an electronic device with a biometric input component which is provided as part of a keyboard and which includes a textured ceramic cover.

BACKGROUND

An electronic device may include one or more input components. For example, an input component may have the form of a button or key which may be pressed to activate one or more functions or operations of the electronic device. In some cases, a button or key may include a biometric sensor which can restrict control of (and/or access to) an associated function or operation of the electronic device.

SUMMARY

Biometric keys and buttons including textured ceramic covers are disclosed herein. The biometric key or button may be part of a keyboard of an electronic device and typically includes a biometric sensor which may be used to control and/or limit access to a function or operation of the electronic device to one or more authorized users. For example, the biometric sensor may be a fingerprint sensor and the biometric button may be a power button or key. The keyboard typically also includes keys which do not include a biometric sensor. Electronic devices including biometric keys or buttons are also disclosed herein.

A biometric key or button may include a cap which defines an input surface and which includes the textured ceramic cover. Other keys of the keyboard may have a polymeric keycap which in some cases may be a plastic keycap. In some embodiments, the cap of the biometric key or button is configured to have a visual and/or tactile property which is similar to that of the polymeric keycap. For example, the ceramic cover may be textured and coated as described herein to obtain the desired visual and/or tactile property. In some cases, a front surface of the cap may have a color, gloss, reflective haze, and/or reflectance which is similar to that of an adjacent polymeric keycap. The cap and the textured ceramic cover may each be configured to provide a desired visual and/or tactile property to the biometric key or button without substantially degrading the performance of the biometric sensor.

In some embodiments, one or more textures of the ceramic cover may be configured to provide a matte appearance and/or a relatively low gloss level to the cap. For example, the gloss level of the cap may be lower than that of a polished ceramic cover. The textured ceramic cover is typically light transmissive and may be substantially transparent. In some cases, the textured ceramic cover may be formed of a single crystal, such as single crystal alumina (e.g., sapphire). In some cases, the textured ceramic cover defines a front surface, a side surface, and a curved surface (alternately, a curved edge) which extends from the front surface to the side surface.

The cap may also include one or more coatings on or over one or more surfaces of the textured ceramic cover. In some embodiments, the cap may include a coating on or over a rear surface of the textured ceramic cover which contributes to the desired color and/or opacity of the cap. When the textured ceramic cover is substantially light transmissive and/or transparent, the coating on the rear surface of the cap may be configured to absorb one or more wavelengths of visible light and thereby help to provide a desired color to the cap. For example, the coating on the rear surface may help to provide a dark color to the cap.

In some embodiments, the cap may include one or more coatings on or over a front surface of the textured ceramic cover. For example, a coating on the front surface of the cap may be configured to reduce the amount of light reflected from the cap and thereby act as an anti-reflection coating. In some cases, the anti-reflection coating may also contribute to the perceived color of the cap.

The disclosure provides a computing device comprising an upper portion comprising an upper housing and a display positioned in the upper housing and a lower portion comprising a lower housing coupled to the upper portion by a hinge, the lower portion including a keyboard. The keyboard comprises an array of keys, each key of the array of keys having a plastic keycap, and a biometric power button positioned adjacent to one or more keys of the array of keys. The biometric power button comprises a sapphire cover, an inorganic multilayer coating disposed on a rear surface of the sapphire cover, a biometric sensor positioned below the sapphire cover, and a switch positioned below the biometric sensor. The sapphire cover defines a textured front surface and a rounded edge extending from the textured front surface to a side surface.

The disclosure further discloses a computing device comprising an upper portion comprising an upper housing and a display positioned within the upper housing and a lower portion comprising a keyboard and a lower housing rotatably coupled to the upper housing. The keyboard includes a set of keys, each key of the set of keys including a keycap formed of a polymer material and a biometric input key. The biometric input key comprises a textured cap comprising a transparent cover formed of alumina, a biometric sensor positioned below the transparent cover, and an electromechanical switch positioned below the biometric sensor and configured to actuate in response to a press on the biometric input key. The transparent cover defines a front surface including a set of surface features configured to diffusely reflect light from the front surface, a side surface, and a curved surface extending between the front surface and the side surface. The textured cap further comprises a first coating covering the front surface and comprising a plurality of inorganic dielectric layers configured to cause destructive interference between light reflected from the first coating and light reflected from the front surface of the transparent cover and a second coating covering a rear surface of the transparent cover and configured to absorb visible light.

In addition, the disclosure provides a computing device comprising a keyboard comprising a biometric button and a set of keys. The biometric button comprises a cap including a sapphire cover, an anti-reflection coating disposed over the front surface of the sapphire cover and comprising a plurality of inorganic dielectric layers, and an optically dense coating disposed over a rear surface of the sapphire cover and comprising a plurality of inorganic dielectric layers and a plurality of metal layers. The biometric button further comprises an electrically conductive support positioned below and coupled to the cap, a biometric sensor positioned below the cap, and a switch positioned below the biometric sensor. The sapphire cover defines a front surface having a first texture configured to provide a first matte appearance, a side surface; and a curved edge between the front surface and the side surface, the curved edge having a second texture. Each key of the set of keys includes a polymeric keycap having a second matte appearance.

BRIEF DESCRIPTION OF THE DRAWINGS

The disclosure will be readily understood by the following detailed description in conjunction with the accompanying drawings, wherein like reference numerals designate like elements.

Figure 1A:
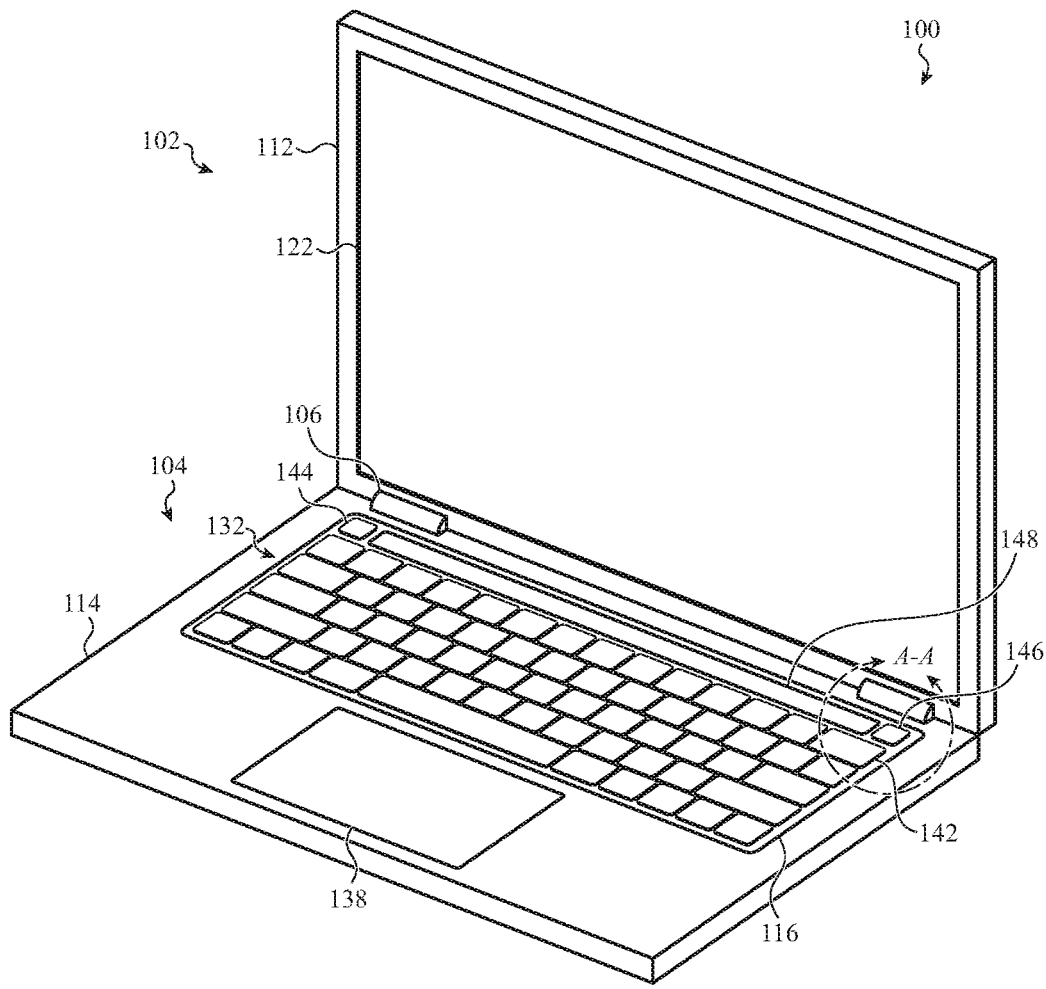
FIG. 1A shows an example electronic device including a biometric input component.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to an electronic device including a biometric input component, such a biometric key or button. The biometric input component may include a cap which defines an input surface for the biometric input component and which includes a textured ceramic cover. In some cases, the cap of the biometric input component may be configured to have a visual and/or tactile property similar to that of an adjacent keycap largely formed of a different material (e.g., a polymer material). For example, the front surface of the cap may have a color, gloss, reflective haze and/or reflectance which resembles that of the adjacent keycap. The ceramic cover may be textured and coated as described herein to obtain the desired visual and/or tactile property.

Each of the cap and the textured ceramic cover may be positioned over the biometric sensor. In addition, each of the cap and the textured ceramic cover may be configured so that they do not substantially interfere with the operation of the biometric sensor. For example, the texture of the ceramic cover and the composition and thickness of any coatings applied to the textured ceramic cover may be configured so that they do not substantially interfere with the operation of the biometric sensor. The cap typically has a texture due at least in part to the texture of the ceramic cover and any coatings applied on or over the front surface of the textured ceramic cover. The cap may therefore be referred to herein as a textured cap.

In some embodiments, one or more textures of the ceramic cover may be configured to provide a matte appearance and/or a relatively low gloss level to the cap. Typically a gloss level of the cap is lower than that of a polished ceramic cover. For example, a front surface of the textured ceramic cover may define a texture configured to provide a gloss level which resembles that of an adjacent keycap. In addition, a curved surface which extends from the front surface to a side surface of the ceramic cover may define a texture configured to provide a gloss level similar to that of the front surface. At least one surface of the ceramic cover may be configured to provide a specified level of reflective haze or extent of diffuse reflection.

In some cases, a texture of the front surface of the ceramic cover is configured to diffusely reflect incident light. The surface features may define any of a range of shapes or configurations which can diffuse or scatter incident light. Surface textures, surface features, and roughness parameters are described in further detail with respect to FIGS. 6A-8 and that description is generally applicable herein.

In some cases, the front surface of the ceramic cover defines a first texture and the curved surface defines a second texture. The first texture may include a first set of surface features and the second texture may include a second set of surface features. In some cases, the front surface and the curved surface may be textured by different methods, so that the first texture and the second texture need not be identical. However, the first texture and the second texture may be similar enough to provide similar visual and/or tactile properties to the textured cap. For example, each of the first set of surface features and the second set of surface features may be configured to diffusely reflect incident light. In addition, the first texture and/or the second texture may be controlled so that the front surface and/or the curved surface is not overly rough.

In some embodiments, the cap includes a coating on or over a rear surface of the textured ceramic cover which contributes to the desired color and/or opacity of the cap. When the ceramic cover is substantially light transmissive and/or transparent, the coating on the rear surface may be configured to absorb one or more wavelengths of visible light and thereby help to provide the desired color to the cap. The color of the cap may be similar to that of an adjacent keycap. The coating may also be configured so that it does not substantially interfere with the performance of the underlying biometric sensor. In some embodiments, the coating on the rear surface is an inorganic multilayer coating, rather than a conventional paint coating or other polymer-based decorative layer. Inorganic multilayer coatings are described in further detail with respect to FIGS. 6A-6B and that description is generally applicable herein.

In some embodiments, the cap may include one or more coatings on or over a front surface of the textured ceramic cover. For example, a coating on the front surface of the cap may be configured to reduce the amount of light reflected from the cap and thereby act as an anti-reflection coating. In some cases, the anti-reflection coating may also contribute to the perceived color of the cap. The one or more coatings over the front surface of the textured ceramic cover may be configured to have a durability suitable for use on an input surface of the biometric input component.

In some embodiments, an anti-smudge coating may be applied over an anti-reflection coating. Anti-reflection coatings and anti-smudge coatings are described in further detail with respect to FIG. 7B and that description is generally applicable herein. Typically, the cap includes a combination of one or more coatings on or over the textured front surface and one or more coatings on or over the rear surface of the ceramic cover.

The biometric input component typically includes other components in addition to the textured cap and the biometric sensor. For example, the biometric input component may include a switch, such as an electromechanical switch. Typical components of the biometric input component are described in further detail with respect to FIGS. 1A-4 and 10 and that description is generally applicable herein.

These and other embodiments are discussed below with reference to FIGS. 1A-10. However, those skilled in the art will readily appreciate that the detailed description given herein with respect to these figures is for explanatory purposes only and should not be construed as limiting.

FIG. 1A shows an example electronic device 100 including a biometric input component 146 which includes a textured ceramic cover. The biometric input component may be a biometric power button or key. Alternately the biometric input component may be a biometric button or key which controls another function of the electronic device.

As shown in FIG. 1A, the electronic device 100 is a notebook computing device (alternately, a notebook) or a laptop computing device (alternately, a laptop). In additional embodiments, the electronic device 100 may be a mobile telephone (alternately, a mobile phone), a tablet computing device (alternately, a tablet), a tablet computing device with a keyboard, a portable media player, a wearable device, or another type of portable electronic device.

FIG. 1A shows the electronic device 100 in an open configuration. As shown in FIG. 1A, the electronic device 100 includes a first or upper portion 102 and a second or lower portion 104. Typically the first portion 102 and the second portion 104 are coupled. As shown in FIG. 1A, the electronic device may include a coupling portion 106. In some cases, the first portion 102 and the second portion 104 may be rotatably or pivotably coupled, such as by a hinge within coupling portion 106. Rotatable coupling of the first portion 102 and the second portion 104 allows the first portion 102 to be rotated towards the second portion 104 to place the electronic device 100 in a closed configuration. However, in additional embodiments, the second portion 104 may be coupled to the first portion 102 in a different manner and/or may be removable with respect to the first portion 102.

The electronic device 100 further includes a first or upper housing 112 and a second or lower housing 114. The first housing 112 is part of the first portion 102 and the second housing 114 is part of the second portion 104. The first housing 112 at least partially encloses a display 122. The display 122 may be a primary display for the electronic device. The display may be a liquid-crystal display (LCD), a light-emitting diode (LED) display, a LED-backlit LCD display, an organic light-emitting diode (OLED) display, an active layer organic light-emitting diode (AMOLED) display, and the like. The display may be covered by a transparent cover, which may comprise one or more glass, ceramic, or polymer layers.

The lower portion 104 includes a keyboard 132. As shown in FIG. 1A, the keyboard 132 includes the biometric input component 146 and a set of keys 142. As previously discussed, the biometric input component may have a cap (e.g., cap 156 of FIG. 1B) which is configured to have one or more visual and/or tactile properties which are similar to that of an adjacent keycap (e.g., keycap 152 of FIG. 1B). For example, the front surface of the cap 156 may be configured to have a color, gloss, reflective haze and/or reflectance which resembles that of the adjacent keycap 152.

Typically, the keycap 152 is a polymeric keycap and the ceramic cover of the cap 156 is textured and coated to obtain the one or more visual and/or tactile properties which are similar to that of a polymeric keycap 152. For example, the keycap 152 may be translucent or opaque and may be textured to provide a low gloss appearance. In addition, a body of the keycap 152 (e.g., the structure supporting or surrounding a symbol or glyph provided on the keycap) may have a color imparted by a dye or pigment in a polymer material of the keycap. In some cases, the keycap 152 may have a dark color that has a L* value from about 20 to about 40, from about 20 to about 35, or from about 20 to about 30.

As referred to herein, a polymeric keycap may substantially comprise a polymer material but may also include a dye, a pigment, a metal, or other marking material applied to an input surface of the keycap to form a marking such as a symbol or glyph on the keycap. A polymeric keycap may be substantially formed from a polymer material. A polymer material includes a polymer, but may also include additives such as a colorant (e.g., a dye or a pigment dispersed within a body of the keycap) and/or other additives to facilitate manufacturing of the keycap and/or to produce the desired properties of the keycap. The polymer material may be a thermoplastic polymer material (also referred to as a plastic herein) and the polymeric keycap may therefore be referred to as a plastic keycap. As an example, the polymer material of the keycap may comprise acrylonitrile butadiene styrene (ABS), polybutylene terephthalate (PBT), polyoxymethylene (POM), and the like.

The biometric input component 146 may be a biometric power button or key or another type of biometric button or key. A biometric key may also be referred to herein as a biometric input key. In the example of FIG. 1A the biometric input component 146 is positioned between the set of keys 142 and the coupling portion 106, but it should be understood that the biometric input component 146 may be located in another position of the second portion 104, such as amongst the set of keys 142. The set of keys 142 may define an array and/or multiple rows of keys. Each of the keys 142 may be depressible. Each of the keys 142 may also have a keycap 152 (shown in FIG. 1B). The keyboard 132 may also include a key 144 positioned between the set of keys 142 and the coupling portion 106. The keyboard 132 may be positioned in a recessed portion 116 of the second housing 114. In some cases, a user of the electronic device 100 may use the keyboard 132 to interact with a user interface presented, at least in part, on the display 122.

The biometric input component 146 may include a biometric sensor (shown in FIGS. 2 and 3) which can be used to authenticate the identity of a user interacting with the biometric input component 146, such as by applying force to a cap 156 (shown in FIG. 1B) of the biometric input component 146. The biometric sensor may be used to restrict access to an electronic device feature or operation associated with the biometric input component 146 to one or more authenticated users. Therefore the biometric input component 146 may also be referred to as a "restricted-access" button or key. A function or operation requiring user authentication may be referred to as a "restricted function" or a "restricted operation." In some cases, one or more functions associated with the biometric input component 146 may be restricted functions while other functions of the biometric input component 146 may be unrestricted functions (which are not restricted to an authenticated user).

In some embodiments, the biometric input component 146 may serve as a power button or key. In some cases, the biometric input component 146 may serve as a multimodal power button or key. For example, a multimodal power button or key may be configured to change a power state of the electronic device 100 and/or a power state of the keyboard 132.

When the biometric input component 146 functions as a restricted-access button, one or more functions associated with a biometric input component 146 may be restricted functions that can only be performed by an authorized user. For example, turning on or off the electronic device may be a restricted function that can only be performed by an authorized user or group of users. In some cases, when the biometric input component 146 is pressed, an image of a fingerprint may be obtained and compared to the previously-obtained fingerprint images of the limited set of authorized users. If it is determined that the obtained image matches that of one of the previously-obtained fingerprint images of the limited set of authorized users, then the electronic device may perform the operation associated with the biometric input component 146 (e.g., turn on, turn off, enter a standby state, and so on). Alternatively, if it is determined that the obtained image does not match that of one of the previously-obtained fingerprint images of the limited set of authorized users, the electronic device may not perform the operation associated with the biometric input component 146. In some cases, the electronic device may notify the user that access is denied. In other cases, the electronic device may not respond in any manner.

In some embodiments, when a user presses the biometric input component 146, the keyboard 132 can send a signal to the electronic device 100 that the button (or key) has been pressed. In response thereto, the electronic device 100 may transition to a different power state such as, but not limited to: an on power state, an off power state, a standby power state, a low power state, or any other suitable power state. One or more functions of the biometric input component 146 may be restricted functions whereas other functions of the biometric input component 146 may be unrestricted functions. More specifically, the operation of transitioning between various power states, performed by the electronic device 100 in this example, may be restricted actions or may be unrestricted actions. In one example, a transition to an on power state from an off power state may be an unrestricted action whereas a transition to an off power state from an on power state may be a restricted action. In another non-limiting phrasing, the electronic device 100 may permit any user to turn on the electronic device 100 or another associated electronic device, while permitting only certain users to turn off the electronic device 100.

When a user presses the biometric input component 146, the electronic device 100 may first determine whether the action or function sought to be performed by the electronic device 100 or the keyboard 132 is a restricted action or an unrestricted action. If the action is a restricted action, then an image of a fingerprint may be obtained by the fingerprint sensor of the biometric input component 146. The obtained fingerprint image may then be compared to each fingerprint image (or templates) of a set of previously-obtained fingerprint images (or templates) to determine whether the user who pressed the biometric input component 146 is authorized to perform the requested function. In some cases, the electronic device may utilize a fingerprint data (such as an image) as one of multiple factors to authenticate a user. Alternatively, if the action is an unrestricted action, the electronic device 100 may perform the action without first obtaining a fingerprint image.

In further embodiments, the biometric input component 146 can be configured to operate in a different manner. For example, the biometric input component 146 may be configured to record and/or log the identity of the last user to touch the biometric input component 146 and/or information related to unrecognized fingerprints obtained by the biometric input component 146.

In some cases, the operation of obtaining a fingerprint image and comparing the fingerprint to a set of known images may be performed by the electronic device 100. In some examples, this operation may be performed within the biometric input component 146, such as by a processor or circuitry disposed within the biometric input component 146. In still further examples, this operation may be performed at least in part by a processor or circuitry coupled to the biometric input component 146.

After a fingerprint obtained by the fingerprint sensor of the biometric input component 146 is recognized, one of a variety of operations may be performed by the electronic device 100, the keyboard 132, or the biometric input component 146. For example, in one embodiment, after a fingerprint image obtained by the fingerprint sensor of biometric input component 146 is recognized, the keyboard 132 may send a signal to the electronic device 100 instructing the electronic device 100 to perform the requested action. In another embodiment, after a fingerprint image obtained by the fingerprint sensor of the biometric input component 146 is recognized, the keyboard 132 may send an encrypted signal, a security certificate, a password, or other information to the electronic device 100 informing the electronic device 100 that the keyboard 132 has identified a user. The electronic device 100 may analyze the information received to determine whether the user is authorized to perform the requested task.

In further embodiments, the electronic device 100 and/or the keyboard 132 can utilize the fingerprint sensor separately from the button containing the sensor. For example, fingerprint image data may be obtained from a user of the electronic device 100 without a press of the button containing the fingerprint sensor. In still other cases, the fingerprint sensor may be configured to image a fingerprint of the user separately from activation of the respective button or associated action. More specifically, the button may have a default function that can be performed by the electronic device 100 that may be changed, updated, augmented, or enhanced only after a fingerprint image is later recognized. For example, in these embodiments, a fingerprint image may be taken after the button is fully pressed. As referred to herein, a fingerprint "image" does not need to be a visual representation of the fingerprint, but may be an array of sensor values that provides a signature that corresponds to the fingerprint, such as a two-dimensional array of sensor values that provides a signature that corresponds to the fingerprint.

In many cases, the electronic device 100 and/or the keyboard 132 can require both a full button press and an authenticated fingerprint in order to perform a task. For example, if the biometric input component 146 is a power button (or key), a full press of the cap by an authenticated user may be required to turn on the electronic device 100 or the keyboard 132. In this manner, two different types of input are required to power on the electronic device.

In further embodiments, the electronic device 100 and/or the keyboard 132 can utilize the fingerprint sensor within the biometric input component 146 in a manner disassociated from the various functions and/or operations of the biometric input component 146. For example, the electronic device 100 may periodically request that a user of the electronic device 100 or the keyboard 132 authenticate the user's identity by placing the user's fingertip on the biometric input component 146. The electronic device 100 may request that a user of the electronic device 100 authenticate his or her identity in order to, without limitation: grant access to an application or program executed by the electronic device 100, grant access to a feature of an application or program executed by the electronic device 100, complete an electronic purchase, access confidential and/or private information stored on or otherwise accessible to the electronic device 100, access system-level files and/or directories stored on or otherwise accessible to the electronic device 100, approve or deny the establishment of a communication link between the electronic device 100 and another local or remote electronic device, apply settings associated with a particular user to the electronic device 100 or an application or program operating thereon, and so on.

As shown in FIG. 1A, the electronic device 100 further includes an input device 148. The input device 148 may include a touch-sensitive display. In some cases, the touch-sensitive display may be used to present a set of indicia that corresponds to a set of commands or functions that may be selected by a user of the electronic device 100. The input device 148 may be responsive to a user touch, allowing selection by a user of one or more of the set of commands or functions. The touch-sensitive display may be generally rectilinear in form and may have a front surface 158 (shown in FIG. 1B). The input device 148 may be positioned above the topmost set of keys of the keyboard 132, in the place of a traditional function row on a conventional keyboard. In some cases, the input device 148 can be used to perform the same functionality as a traditional function row, as well as perform an expanded and diverse set of commands and functions as described herein.

An input device 148 including a display can be configured to display a set of visual indicia that corresponds to an input mode of the keyboard 132 of the electronic device 100. For example, the input device 148 may be configured to display a set of virtual keys. The indicia on the display may correspond to one or more of the following: a hardware-dependent input mode used to control one or more devices or hardware elements of the keyboard 132 or the electronic device 100; a software-dependent input mode used to control one or more aspects of a software program being executed on the electronic device 100; a user-defined mode that is configurable by a user of the electronic device 100 or the keyboard 132; and other input mode examples which are described herein. The display of the input device 148 may be used to present a set of static indicia, one or more animated indicia, or a combination of static and animated indicia.

The display of input device 148 may be integrated with one or more touch sensors and/or force sensors that are configured to detect various combinations of user touch and force input on the front surface 158 of the input device 148. The touch and/or force sensors may provide a touch-sensitive surface that is configured to detect the location of a touch, a magnitude and/or direction of force applied, and/or a movement of the touch along the input device 148. The touch and/or force sensors may be used separately or in combination to interpret a broad range of user inputs such as, but not limited to: touch-based gestures, force-based gestures, touch patterns, tap patterns, single-finger gestures, multi-finger gestures, multi-force gestures, and so on.

Figure 10:
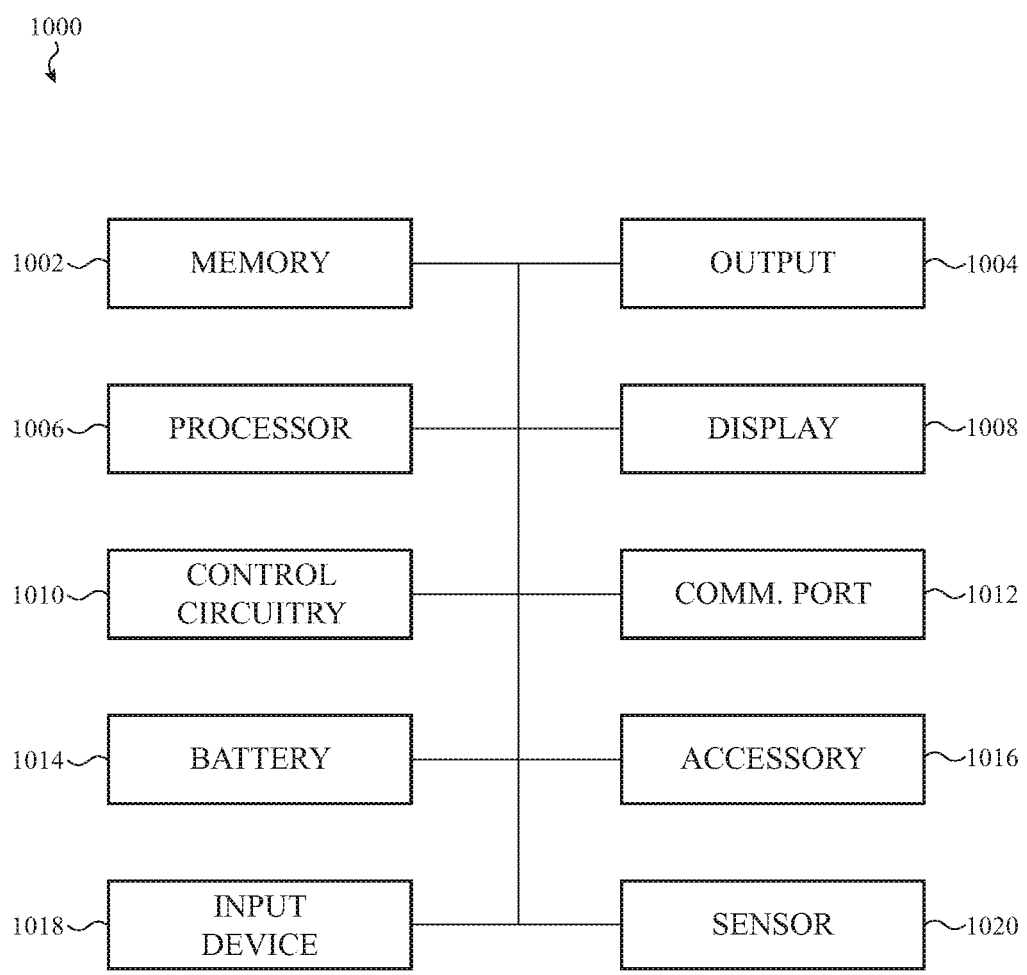
FIG. 10 shows a block diagram of a sample electronic device that can incorporate a biometric input component with a textured cap.

As shown in FIG. 1A, the electronic device 100 further includes a force and/or touch sensitive trackpad 138 which also functions as an input component. The electronic device typically includes one or more additional components, such as a memory, a processor, control circuitry, a battery, an output device, a communication port, an accessory (such as a camera), and an additional sensor. One or more of these additional components may interface or interoperate, either directly or indirectly, with the biometric input component 146. The description of electronic device components provided with respect to FIG. 10 is generally applicable herein, and, for brevity, is not repeated here.

Figure 1B:
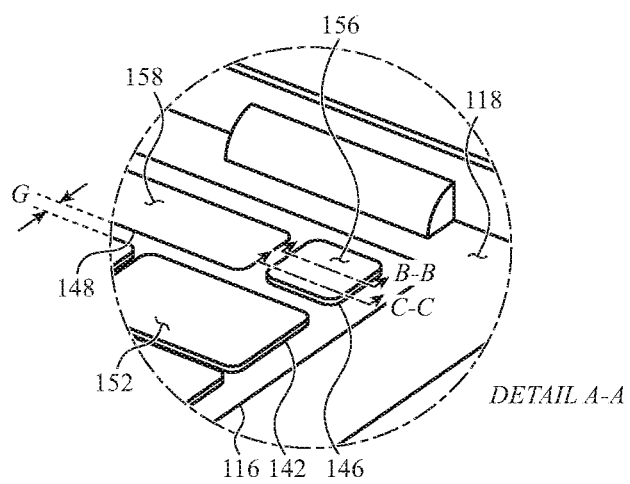
FIG. 1B shows a detail view of the biometric input component of FIG. 1A.

FIG. 1B shows a detail view of the biometric input component 146 of FIG. 1A (e.g., of area A-A in FIG. 1A). As shown in FIG. 1B, the biometric input component 146 includes a cap 156 which defines an input surface of the biometric input component 146. In addition, the key 142 includes a keycap 152 which defines an input surface of the key 142.

The cap 156 of the biometric input component 146 may include a ceramic cover. A cap for a biometric input component, such as cap 156, may also be generally referred to herein as a cover assembly. In some examples, the ceramic cover may substantially or essentially consist of single crystal alumina, e.g., single crystal alpha alumina or sapphire. The cap 156 may have a texture due at least in part to the texture of the ceramic cover and may thus be referred to as a textured cap. Examples of ceramic covers are shown in the cross-section views of FIGS. 6A-8. The description of ceramic covers provided with respect to FIGS. 6A-8 is generally applicable herein, and, for brevity, is not repeated here.

The cap 156 of the biometric input component 146 may be textured to help provide a desired visual and/or tactile property to the cap. In some embodiments, the cap 156 includes one or more coatings applied to the front side of a textured ceramic cover and one more coatings applied to the rear side of the textured ceramic cover. These front and rear coatings may also contribute to one or more of the desired visual and/or tactile properties of the cap. The description of front and rear coatings provided with respect to FIGS. 6A-8 is generally applicable herein, and, for brevity, is not repeated here.

In some embodiments, the cap 156 may be configured to have one or more visual properties which resemble those of the input surface of another input component, such as the key 142, the key 144, and/or the input device 148. In some cases, a front surface of the cap 156 may be configured to have one or more visual properties which resemble those of a front surface of the keycap 152. For example, the front surface of the cap 156 may have a color, gloss, reflective haze and/or reflectance which resembles that of the front surface of another input component, such as the front surface of the keycap 152. The textured ceramic cover may have a visual and/or tactile property which differs from that of a conventionally polished ceramic cover. Texture and visual properties of the cap 156 are discussed in greater detail with respect to FIGS. 6A-8. The description provided with respect to FIGS. 6A-8 is generally applicable herein, and, for brevity, is not repeated here.

In some cases, the front surface of the cap 156 may be aligned and substantially coplanar with the front surface of another input component. For example, the front surface of the cap 156 may be aligned and substantially coplanar with the front surface of the keycap 152. In some cases, the front surface of the cap 156 may be positioned below a front surface 118 of the second housing 114, so that the front surface is recessed with respect to the front surface 118. However, the front surface of the cap 156 is typically elevated with respect to the bottom of the recess 116. The front surface of the cap 156 may also be referred to herein as an exterior surface, as it faces away from the interior of the second portion 104 of the electronic device.

In some cases, the cap 156 of the biometric input component 146 is spaced apart from the cap 152 of an adjacent key 142. For example, the spacing or gap G between the cap 156 and the cap 152 of the adjacent key 142 may be from about 0.5 mm to about 5 mm or from about 1 mm to about 5 mm. In addition, the cap 156 of the biometric input component 146 may be spaced apart from the front surface 158 of the input device 148 and this spacing or gap may be from about 0.5 mm to about 5 mm or from about 1 mm to about 5 mm.

Figure 1C:
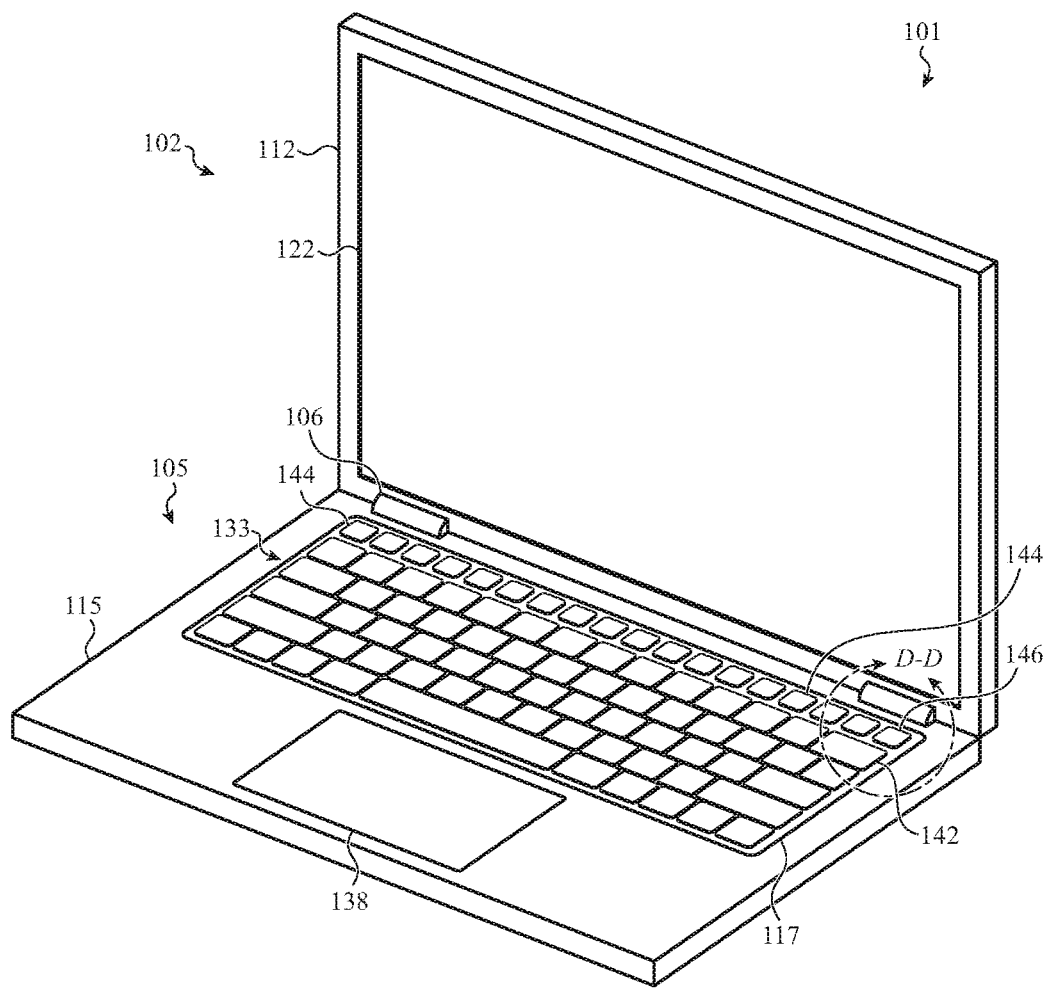
FIG. 1C shows another example of an electronic device including a biometric input component.

FIG. 1C shows another example of an electronic device 101 including a biometric input component 146, which may be a biometric button or key. As previously described with respect to FIGS. 1A-1B, a cap 156 of the biometric input component 146 comprises a textured ceramic cover and may be configured to have a visual and/or tactile property similar to that of an adjacent keycap of the electronic device.

The electronic device 101 does not include the input device 148 of electronic device 100, but instead the keyboard 133 includes additional keys 144. At least some of the keys 144 may be "function keys" which are associated with one or more functions of the electronic device 101. Each of the first portion 102, the second portion 105, the coupling portion 106, the first housing 112, the second housing 115, the depression 117, the front surface 119, the display 122, the keyboard 133, force and/or touch sensitive trackpad 138, the keys 142 and 144, and the biometric input component 146 may be similar to the respective elements 102, 104, 106, 112, 114, 116, 118, 122, 132, 138, 142, 144, and 146 previously described for electronic device 100 and, for brevity, that description is not repeated here.

Figure 1D:
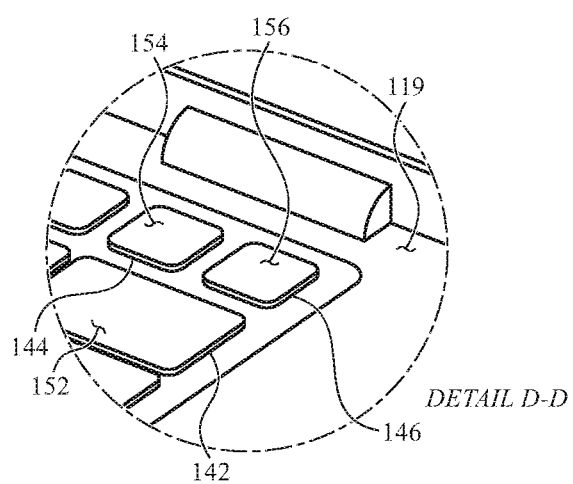
FIG. 1D shows a detail view of the biometric input component of FIG. 1C.

FIG. 1D shows a detail view of the biometric input component 146 of FIG. 1C (e.g., of area D-D in FIG. 1C). As was previously described with respect to FIGS. 1A and 1B, the cap 156 of the biometric input component 146 may be configured to have one or more visual properties which resemble those of the key caps 152 of the keys 142. In addition or alternately, the cap 156 may be configured to have one or more visual properties which resemble those of the key caps 154 of the keys 144.

In some cases, the cap 156 of the biometric input component 146 is spaced apart from the cap 154 of an adjacent key 144. The spacing between the cap 156 and the key cap 154 of an adjacent key 144 may be similar to the spacing between the cap 156 and an adjacent key 142 previously described with respect to FIG. 1B.

Figure 2A:
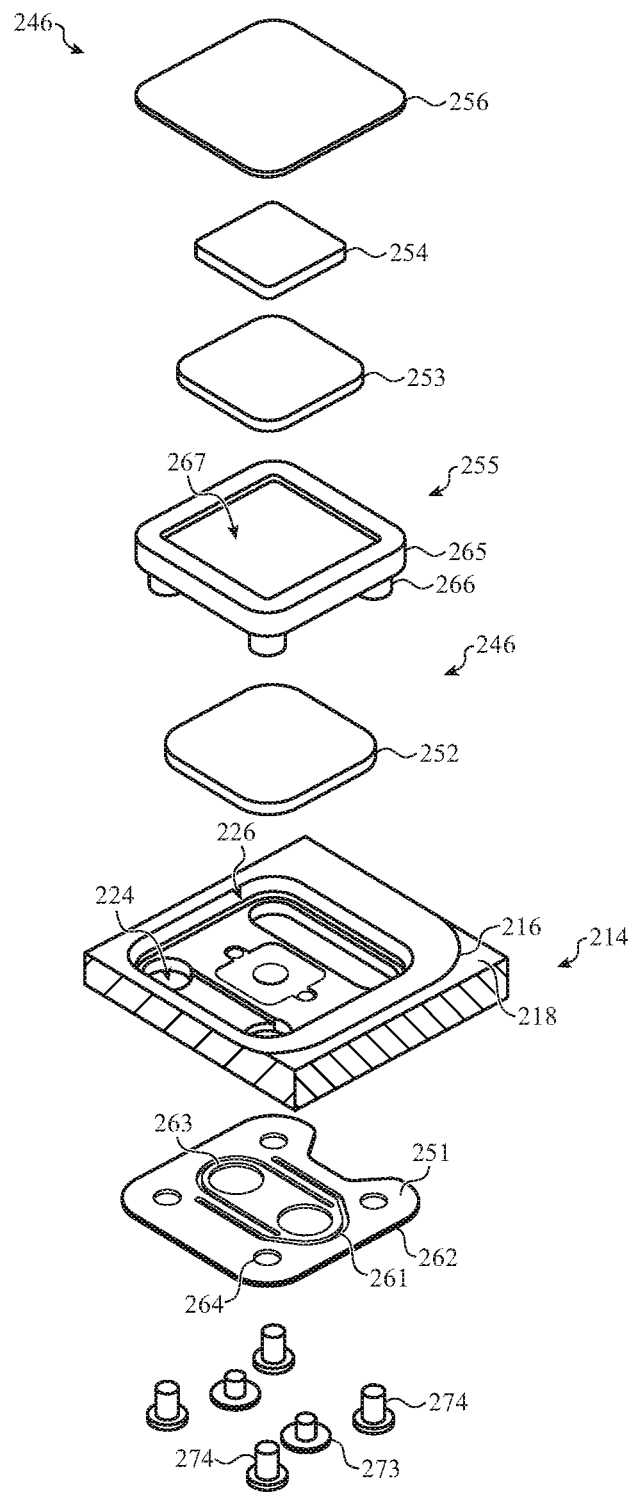
FIG. 2A shows an exploded view of a biometric input component including a spring plate.

FIG. 2A shows an exploded view of elements of a biometric input component 246 including a biometric sensor 254 and a cap 256 comprising a textured ceramic cover. The biometric input component 246 may be a biometric button or key. The cap 256 of the biometric input component 246 may be configured to have a visual and/or tactile property similar to that of an adjacent keycap of the electronic device. As shown in FIG. 2A, the biometric input component 246 includes a cap 256, a support 255, the biometric sensor 254, a circuit layer 253, a switch 252, and a key assembly 251. The key assembly 251 defines a spring plate. The cap 256, the support 255, the biometric sensor 254, the circuit layer 253, the switch 252, the key assembly 251, and fasteners 273 and 274 may be collectively referred to as a "button assembly" or a "key assembly." The biometric input key 246 may be an example of the biometric input key 146 or any other biometric input key described herein.

FIG. 2A also shows a portion of a second housing 214. The second housing 214 defines a top surface 218, a first recess 216, a second recess 226, and holes 224. The button assembly may be configured to couple to the second housing 214 so that at least some of the elements of the button (or key) assembly are accommodated within the recess 226. As indicated in FIG. 2A, the cap 256, the biometric sensor 254, the circuit layer 253, and the switch 252 are positioned on an exterior side of the housing 214 while the key assembly 251 is positioned on an interior side of the housing 214. The protruding portions 266 of the support 255 may pass through the holes 224 and may be fastened to the key assembly 251 by the fasteners 274. The fasteners 273 may fasten the key assembly 251 to the second housing 214. The fasteners 273 may pass through holes 263 in the key assembly 251 while the fasteners 274 may pass through holes 264 in the key assembly 251.

The biometric input component 246 includes a cap 256. As previously described with respect to FIGS. 1A-1B, the cap 256 may include a ceramic cover, such as a sapphire cover, one or more coatings applied to the front side of the cover and one or more coatings applied to the rear side of the cover. The cap 256 may be configured to provide one or more desired visual and/or tactile properties. The description of ceramic covers and caps provided with respect to FIGS. 1B and 5-8 is generally applicable herein, and, for brevity, is not repeated here.

Figure 3:
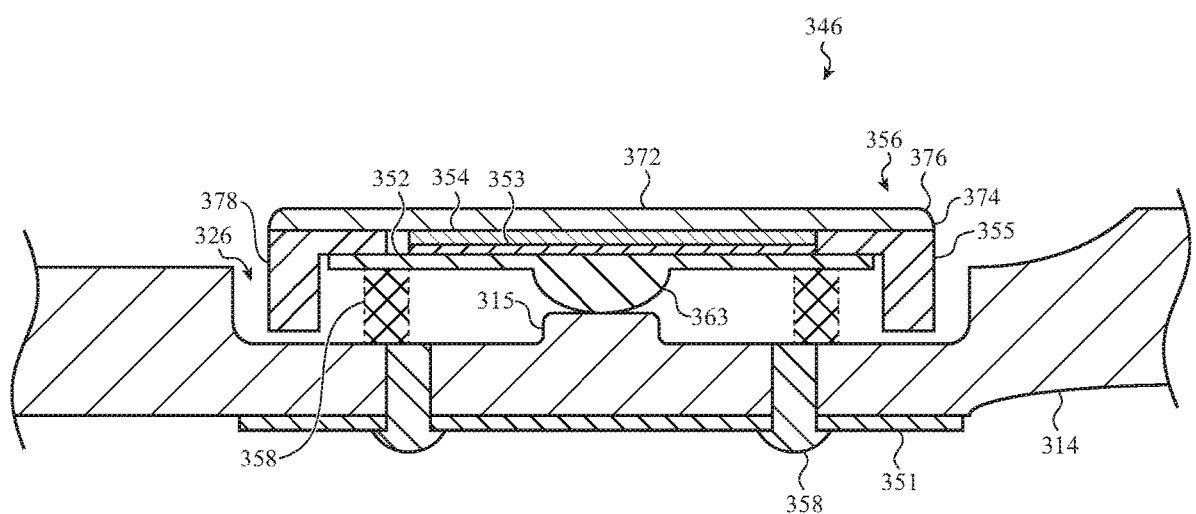
FIG. 3 shows a cross-section view of a biometric input component.

As shown in FIG. 2A, the biometric input component 246 further includes a support 255. The cap 256 is typically coupled to the support 255, as shown in FIG. 3. For example, the cap 256 may be directly coupled to the support 255 by an adhesive. The textured ceramic cover included in the cap 256 is also typically coupled to the support 255. In other embodiments, the support 255 may have a different form or may be omitted.

As shown in FIG. 2A, the support 255 may include a frame portion 265 and multiple protruding features (e.g., bosses) 266 coupled to the frame portion 265. The frame portion 265 may define a central opening 267 and the cap 256 may span the central opening 267. In the examples of FIGS. 2 and 3, an entirety of the frame portion 265 is positioned below the cap 256. In some cases, the frame portion 265 and the protruding features 266 may be formed as an integral piece. The support 255 may be formed of an electrically conductive material, such as a metal (including a metal alloy).

As previously described, the biometric input component 246 includes a biometric sensor 254. The biometric sensor 254 may be positioned at least partially within central opening 267 defined by the frame portion 265. The biometric sensor 254 may be directly coupled to the cap 256, such as by an adhesive.

The biometric sensor 254 may be configured to obtain one or more forms of biometric data. In some embodiments, the biometric sensor 254 may capture one or more fingerprint images and may therefore be referred to herein as a "fingerprint sensor." As used herein, the term "image" encompasses both an actual graphical image of a fingerprint (or portion thereof) as well as a data set representing certain aspects of a fingerprint, such as a mathematical construct derived from aspects of a user's fingerprints. The biometric sensor 254, alone or in combination with processing circuitry, may produce a two-dimensional representation of the fingerprint, which may be a two-dimensional representation of a portion of the fingerprint.

A fingerprint sensor can be implemented with any suitable fingerprint imaging or detection technology including, but not limited to, capacitative sensing, optical sensing, electrical impedance sensing, acoustic impedance sensing, and so on. In some embodiments, the fingerprint sensor may include an array of electrodes such as capacitative sensors, electrical impedance sensors, ultrasonic sensors, and the like. As an example, the fingerprint sensor may be capacitance-based and the biometric input component may be configured so that one or more capacitative sensors/electrodes can capacitatively couple to the finger of a user through the cap 256. For example, the ceramic cover of the cap 256 may be suitably thin, such as from 100 microns to 750 microns, from 100 microns to 400 microns, or from 200 microns to 500 microns. In additional embodiments, the biometric data may alternately or additionally include heart rate, blood oxygenation, respiration rate, medial arterial pressure, galvanic skin response, vein patterns, and the like. The description of the biometric sensor 254 is generally applicable to the biometric sensors described herein.

As shown in FIG. 2A, the biometric input component 246 also includes a circuit layer 253. The circuit layer 253 may be coupled to the biometric sensor 254, such as by an adhesive. The circuit layer 253 may include a flexible circuit. Further, the circuit layer 253 may be configured to send a signal to and/or receive a signal from the biometric sensor. In some cases, the circuit layer 253 may include processing circuitry. For example, the processing circuitry may transmit signals to or from the biometric sensor, may be configured to process a signal from the biometric sensor, or may connect the biometric sensor 254 to additional processing circuitry. In some cases, the circuit layer is in electrical communication with the fingerprint sensor and configured to produce a two-dimensional representation of features of a fingerprint (an "image" of the fingerprint). In some cases, a power supply may be coupled to the circuit layer and/or the biometric sensor 254.

The biometric input component 246 further includes a switch 252. In some cases, the switch 252 may be an electromechanical switch such as a tactile switch (tact switch). The electromechanical switch may include a compliant and/or biasing component such as a compressible dome, spring, beam, or other structure. For example, the electromechanical switch may be a dome switch including one or more compressible dome structures. In some cases, the compliant and/or biasing component (e.g., the compliant component 363 shown in FIG. 3) may be provided on an underside of the switch 252, facing the housing 214. When the biasing component collapses, it may complete an electrical circuit, thereby causing the actuation signal to be produced.

More generally, the biometric input component 246 may replace the switch 252 with a force sensor. Such a force sensor may provide an electrical response which indicates an amount of force applied to the force sensor and/or cap 256. The force sensor may detect the amount of force through capacitance force sensing, ultrasonic force sensing, a strain gauge technique, an optical technique, a resistance technique, or a piezoelectric technique. In some cases, the force sensor may be configured to compare the amount of applied force to multiple threshold levels and provide output signals accordingly.

Figure 2B:
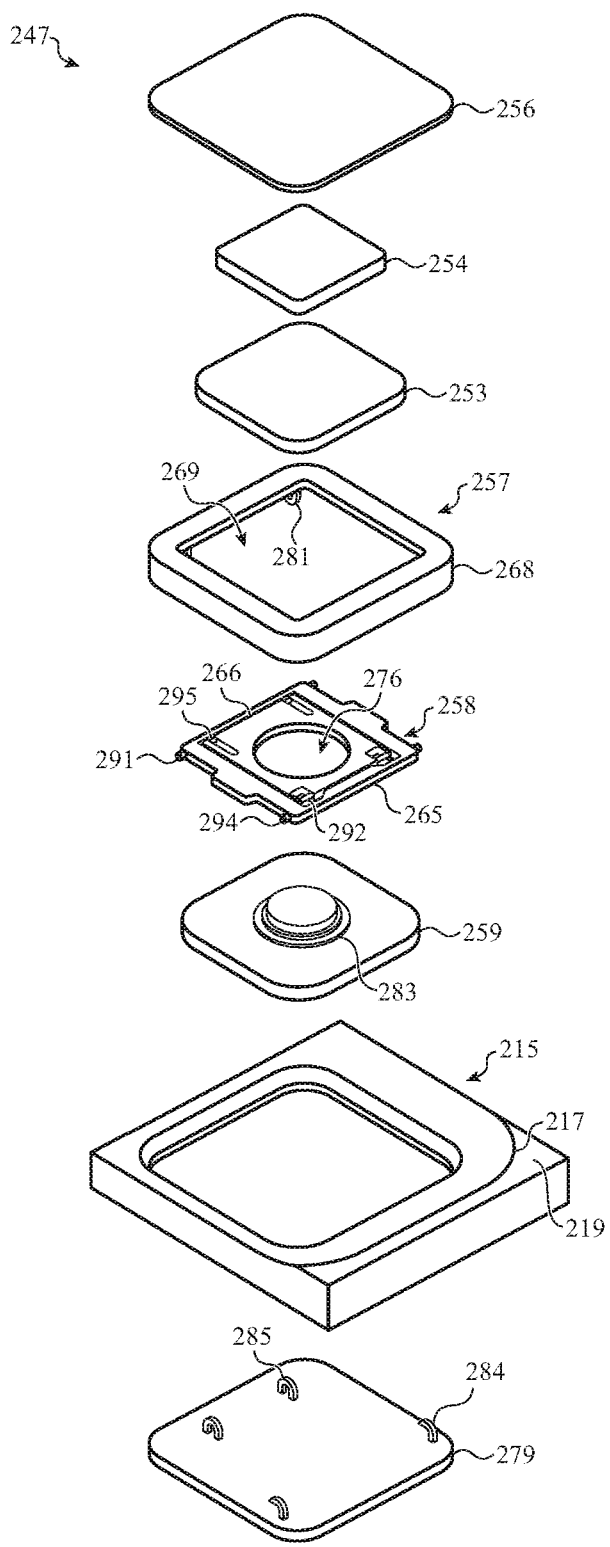
FIG. 2B shows an exploded view of a biometric input component including a scissor mechanism.

As shown in FIG. 2A, the biometric input component 246 further includes a key mechanism 251 which helps to control downward displacement of the cap 256. The key mechanism 251 can also provide an upward biasing force to the cap 256. As shown in FIG. 2A, the key mechanism 251 defines a spring plate. The key mechanism 251 may be configured to provide an upward biasing force to the cap 256, as is described in more detail below. The key mechanism 251 of FIG. 2A may cooperate with a compliant and/or biasing component (e.g., a collapsible dome) to control movement of the cap 256. Such a compliant and/or biasing component may be provided as part of the switch 252. The example of FIG. 2A is not limiting and in additional examples the key mechanism may include a scissor mechanism (as shown in FIG. 2B), a butterfly mechanism, a compliant membrane, a collapsible dome, a spring, or a combination of these. Further, in some embodiments, the biometric component input may be configured to respond to a press on the cap without requiring significant travel of the cap.

The key mechanism 251 may be formed of a metal (including a metal alloy), plastic, or like material suitable for providing the biasing force. For example, the key assembly 251 may be formed of steel, including tempered steel. As shown in FIG. 2A, the key assembly 251 may be formed as a plate with two oppositely oriented cutout portions forming two independent "tongues." However the specific geometry of the key assembly 251 shown in FIG. 2A is merely an example and other configurations of the key assembly 251 may also be suitable.

Figure 4A:
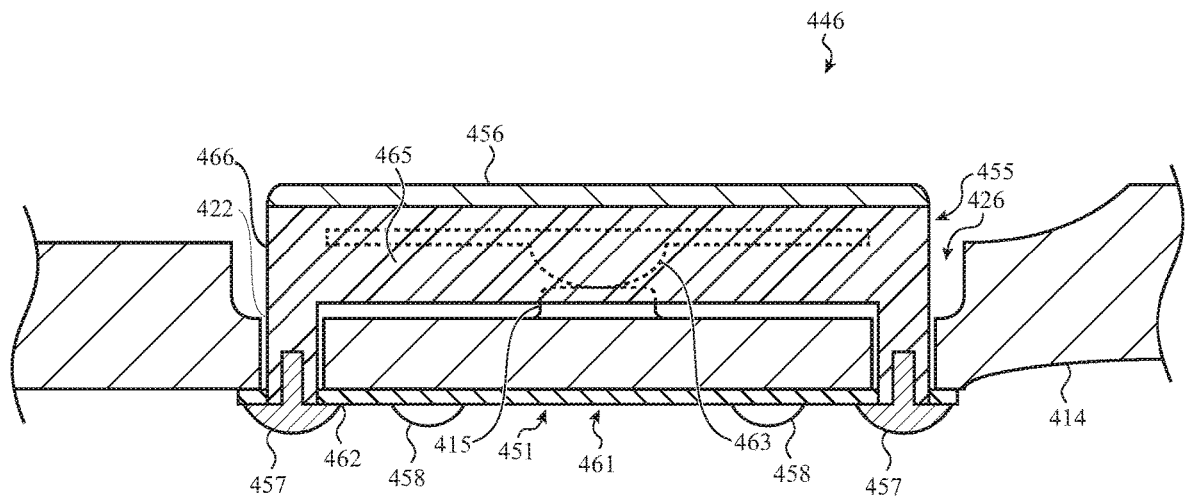
FIG. 4A shows another cross-section view of a biometric input component.
Figure 4B:
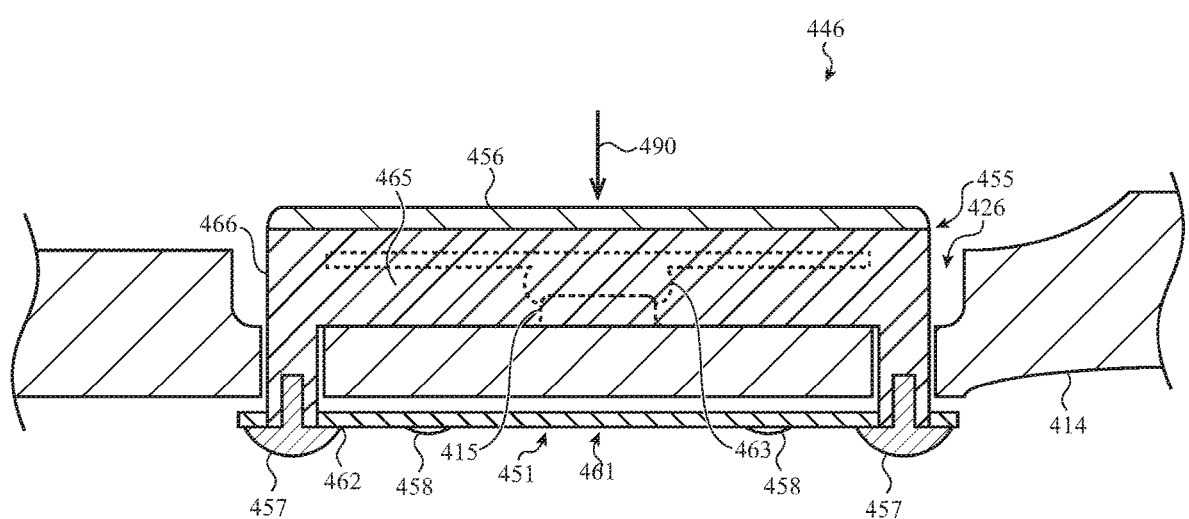
FIG. 4B shows movement of the biometric input component of FIG. 4A in response to a downward force.

As illustrated in FIG. 2A, one portion of the key assembly 251 may be coupled to an interior surface of the housing 214 and another portion of the key assembly 251 may be coupled to the cap 256. As shown in FIG. 2A, a central portion 261 of the key assembly 251 may be attached to the housing 214 using the fasteners 273. The fasteners 273 may pass through openings 263 in the key assembly 251. A peripheral portion 262 of the key assembly 251 may be attached to the protruding portions 266 of the support 255 using the fasteners 274. The fasteners 274 may pass through openings 264 in the key assembly 251. When force is applied to the cap 256, the peripheral portions 262 of the key assembly, which are coupled to the protruding portions 266, may deflect away from the interior surface of the housing 214 (as shown in FIG. 4B). In some cases, the protruding portions 266 may protrude from the holes 224 when force is applied to the cap 256 (as shown in FIG. 4B). When force is removed from the cap 256 (e.g., when a user no longer applies force to the cap), the key assembly 251 may provide an upward biasing force to return the cap 256 to its original position.

FIG. 2B shows an exploded view of elements of a biometric input component 247 including a biometric sensor 254 and a cap 256 comprising a textured ceramic cover. The biometric input component 247 may be a biometric button or key. The cap 256 of the biometric input component 247 may be configured to have a visual and/or tactile property similar to that of an adjacent keycap of the electronic device. As shown in FIG. 2B, the biometric input component 247 includes a cap 256, a support 257, the biometric sensor 254, a circuit layer 253, a key mechanism 258, and switch 259. The cap 256, the support 257, the biometric sensor 254, the circuit layer 253, the switch 259, the key mechanism 258, and the support plate 279 may be collectively referred to as a "button assembly" or a "key assembly." The biometric input key 247 may be an example of the biometric input key 146 or any other biometric input key described herein. Each of the cap 256, the biometric sensor 254, the circuit layer 253, and the switch 259 may be similar to the respective elements 256, 254, 253, and 252 previously described for biometric input component 246 and, for brevity, that description is not repeated here.

As shown in FIG. 2B, the key mechanism 258 defines a scissor mechanism. The key mechanism 258 may also cooperate with a compliant and/or biasing component such as a collapsible dome 283 to control movement of the cap 256. The compliant and/or biasing component may be provided as part of the switch 259. The example of FIG. 2B is not limiting and in additional examples the key mechanism may include a spring plate (as shown in FIG. 2A), a butterfly mechanism, a compliant membrane, a collapsible dome, a spring, or a combination of these. Further, in some embodiments, the biometric component input may be configured to respond to a press on the cap without requiring significant travel of the cap.

As shown in FIG. 2B, the key mechanism 258 comprises an external scissor member 265 and an internal scissor member 266. The external scissor member 265 may include retaining features (e.g., retaining features 291 and 294) and the interior scissor member 266 may include retaining features (e.g., retaining features 292 and 295) which allow the scissor members 265 and 266 to be coupled to the frame portion 268 and the support plate 279, as described in further detail below. The internal scissor member 266 may also define one or more engagement features which engage with the external scissor member 265 to allow the internal scissor member 266 to pivot with respect to the external scissor member 265. The external scissor member 265 may comprise a corresponding engagement feature, which may be a notch or slot configured to receive the engagement features. Pivoting of the internal scissor member 266 with respect to the external scissor member 265 can change the height spanned by the scissor mechanism 258.

The internal scissor member 266 may define an opening 276. The opening 276 may be configured to receive a compliant component 283 of the switch 259 (e.g., a compliant component similar to that of compliant component 363 shown in FIG. 3). The scissor mechanism 258 is disposed below the cap 256 and is configured to support the cap 256 and the support 257 during travel of the cap 256. For example, the height spanned by the scissor mechanism 258 decreases to allow the cap 256 to be pressed downwards and the height spanned by the scissor mechanism increases as the cap 256 returns to its rest position (e.g., by action of a compliant component). The examples of the external scissor member 265 and the internal scissor member 266 shown in FIG. 2B are not limiting and each of the external scissor member 265 and the internal scissor member 266 may have a shape and/or size different from that shown in FIG. 2B.

As shown in FIG. 2B, the support 257 may include a frame portion 268. The frame portion 268 may define a central opening 269 and the cap 256 may be positioned within and substantially fill the central opening 269. The frame portion 268 may be configured to interface with the external scissor member 265 and the internal scissor member 266. For example, the frame portion 268 may comprise one more retaining components or features (e.g., retaining feature 281) configured to cooperate with the external scissor member 265 and the internal scissor member 266. For example, an underside of the frame portion 268 may include a retaining feature 281 configured to pivotally couple a first portion of one of the external scissor member 265 and the internal scissor member 266 to the frame portion 268. The underside of the frame portion 268 may also be configured to allow sliding movement of a second portion of the other of the external scissor member 265 and the internal scissor member 266. In the example of FIG. 2B, an entirety of the frame portion 268 is positioned below the cap 256. The support 257 may be formed of an electrically conductive material, such as a metal (including a metal alloy).

In some cases, one of the external scissor member 265 and the internal scissor member 266 pivotally couple to a support plate 279 and the other of the external scissor member 265 and the internal scissor member 266 is slidably coupled to the support plate 279. For example, the support plate 279 may include one or more retaining features 284 configured to allow pivotal movement and one or more retaining features 285 configured to allow sliding movement. In some cases, the switch 259 may be coupled to the support plate 279 and a compliant component provided on an upper side of the switch 259, facing the cap 256. In additional examples, the switch 259 may be coupled to the support 279 and the compliant component may be provided on an underside of the switch 259, facing the third housing 215. The support plate 279 may be positioned below the recess 217 of the third housing 215.

FIG. 2B also shows a portion of a third housing 215. The third housing 215 defines a top surface 219 and a recess 217. The button assembly may be configured to couple to the third housing 215 so that at least some of the elements of the button (or key) assembly are accommodated within the recess 217.

FIG. 3 shows a cross-section view of a biometric input component 346 including a biometric sensor 354 and a cap 356 comprising a textured ceramic cover. The biometric input component 346 may be a biometric button or key. The cap 356 of the biometric input component 346 may be configured to have a visual and/or tactile property similar to that of an adjacent keycap of the electronic device. The biometric input component may be a biometric power button or key or another type of biometric input component. FIG. 3 may show an example of the electronic device 100 and biometric input component 146 of FIGS. 1A-1B, with the cross-section taken along B-B. The biometric input component 346 is coupled to a housing 314. The description of biometric input components and biometric sensors provided with respect to FIGS. 1A-1D and 2 is generally applicable herein and, for brevity, is not repeated here.

As shown in FIG. 3, the cap 356 is coupled to a front side of the support 355 and the switch 352 is coupled to a rear side of the support 355. The biometric sensor 354 is coupled to the cap 356 and the circuit layer 353 is coupled between the biometric sensor 354 and the switch 352. In some cases, the coupling may be achieved with an adhesive.

In the example of FIG. 3, the switch is an electromechanical switch comprising a compliant component 363. In some cases, the electromechanical switch may include multiple compliant components. In the example, of FIG. 3, the compliant component 363 is dome-shaped and contacts a protrusion 315 positioned within the recess 326 of the housing 314.

The key assembly 351 is attached to an interior surface of the housing 314 with fasteners 358. The support 355 may include bosses similar to bosses 266 and additional fasteners similar to fasteners 257 may couple the support 355 to the key assembly 351 (in a similar fashion as shown in FIGS. 4A-4B). The cap 356, the support 355, the biometric sensor 354, the circuit layer 353, the switch 352 and the key assembly 351 may be similar to the cap 256, the support 255, the biometric sensor 254, the circuit layer 253, the switch 252 and the key assembly 251 and, for brevity, that description is not repeated here.

As shown in FIG. 3, the cap 356 may define a front surface 372, a side surface 374, and a rounded or curved surface 376 extending between the front surface 372 and the side surface 374. In some embodiments, the rounded or curved surface 376 may be referred to as a rounded edge or corner. In the example of FIG. 3, the side of the cap 356 generally aligns with (also, is flush with) a side 378 of the support 355. However, in some cases, a lateral dimension (e.g., L of FIG. 5B) of the cap 356 may be greater than a lateral dimension of the support 355, so that the side 374 of the cap 356 projects (alternately extends) beyond the side 378 of the support 355.

Typically, the front surface 372 of the cap 356 is textured. The rounded surface 376 may also be textured. In some cases, a texture of the front surface 372 may be similar to a texture of the rounded surface 376. The description of the textures of the front surface and the rounded surface provided with respect to the detail view of FIGS. 6A-8 is generally applicable herein and, for brevity, is not repeated here.

As shown in FIG. 3, the support 355 is positioned under the cap 356, so that the cap 356 would be positioned between the support 355 and the finger of a user. As previously discussed, the support 355 may be formed of an electrically conductive material. As an example, the fingerprint sensor may be capacitance-based and the biometric input component may be configured so that the support 355 can also capacitively couple to the finger of a user through the cap 356. For example, the textured ceramic cover of the cap may be suitably thin, such as from 100 microns to 750 microns, from 100 microns to 400 microns, or from 200 microns to 500 microns. In some cases, the support 355 may be coupled to a circuit ground. In other cases, a voltage may be applied between the support 355 and a circuit ground. The voltage may be a direct current (DC) voltage or an alternating current (AC) voltage. The voltage applied between the support 355 and the circuit ground may have a magnitude, a sign, and/or a phase different than a voltage applied between a capacitive sensor/electrode of the biometric sensor and the circuit ground.

FIG. 4A shows another cross-section view of a biometric input component 446 including a biometric sensor and a cap 456 comprising a textured ceramic cover. The cap 456 of the biometric input component 446 may be configured to have a visual and/or tactile property similar to that of an adjacent keycap of the electronic device. FIG. 4A may show an example of the electronic device 100 and the biometric input component 146 of FIG. 1A, with the cross-section taken along C-C. The biometric input component 446 may be a biometric power button or key or another type of biometric input component. The biometric input component 446 is coupled to a second housing 414 and is positioned at least partially within a recess 426 of the housing.

The cross-section view of FIG. 4A passes through the protruding portions (bosses) 466 of the support 455 as well as through the frame portion 465. Therefore, some components of the button or key assembly which were shown in FIGS. 2-3 are not visible in the cross-section view of FIG. 4A as they are hidden by the frame portion 465. For the purposes of illustration, a compliant member (e.g., a dome) 463 of a switch and a protrusion 415 from the bottom of the recess 426 are shown with dotted lines.

In a similar fashion as previously described with respect to FIG. 2A, a central portion 461 of the key assembly 451 may be attached to the housing 414 using the fasteners 458. A peripheral portion 462 of the key assembly 451 may be attached to the protruding portions 466 (bosses) of the support 455 using the fasteners 457.

FIG. 4B shows movement of the biometric input component 446 of FIG. 4A in response to a downward force 490. When the downward force 490 is applied to the cap 456, the compliant component 463 may at least partially collapse against the protrusion 415, allowing the cap 456 to move downwards. In addition, the peripheral portions 462 of the key assembly, which are coupled to the protruding portions (bosses) 466, may deflect away from the interior surface of the housing 414. In some cases, the protruding portions (bosses) 466 may protrude from the holes 422 when the downward force 490 is applied to the cap 456. When the downward force 490 is removed from the cap 456 (e.g., when a user no longer applies force to the cap), the key assembly 451 may provide an upward biasing force to return the cap 456 to its original position. More generally, a biometric input component may not include a key assembly but may include another type of mechanism to allow the cap to be depressed, such as a scissor mechanism or a butterfly mechanism.

Figure 5A:
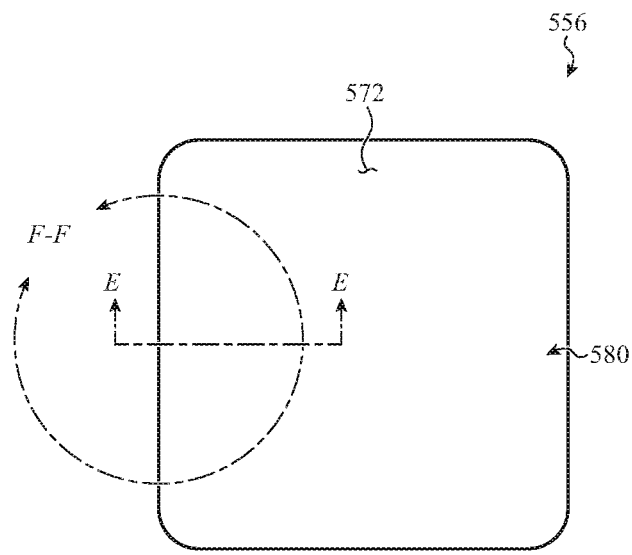
FIG. 5A shows a top view of a cap for a biometric input component.

FIG. 5A shows a top view of a cap 556 for a biometric input component, such as a biometric button or key. The cap 556 includes a ceramic cover 580. The cap 556 of the biometric input component may be configured to have a visual and/or tactile property similar to that of an adjacent keycap of the electronic device. The cap 556 may be an example of the cap 156 or the cap of any other biometric input key described herein. Ceramic covers are described in more detail with respect to FIGS. 6A-8 and the description provided with respect to FIGS. 6A-8 is generally applicable herein. As shown in more detail in the cross-section view of FIGS. 6A-8, the cap 556 may also include one or more coatings applied to a front surface of the ceramic cover and one or more coatings applied to a rear surface of the ceramic cover. The description of these coatings provided with respect to FIGS. 6A-8 is generally applicable herein and, for brevity, is not repeated here.

In the example, of FIG. 5A, the front surface 572 of the cap 556 generally has the shape of a square with rounded corners. However, it should be understood that the example of FIG. 5A is not limiting and the front surface of the cap 556 may have another shape, such as a rectangle (with or without rounded corners), a circle, an ellipse, an oblong, a polygon (with or without rounded corners), and the like. In some cases, the shape of a front surface of the cap 556 may be similar to that of an adjacent key of the keyboard.

Figure 5B:
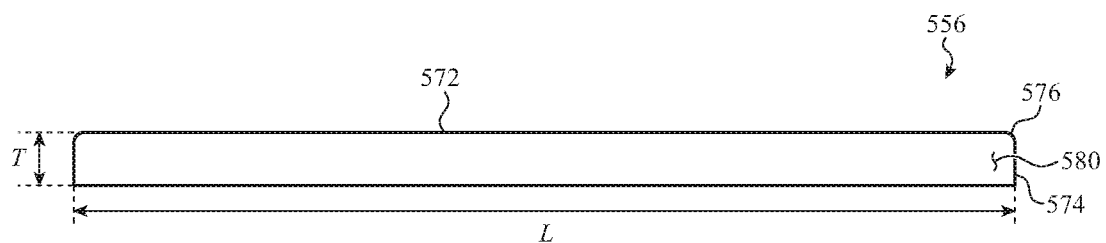
FIG. 5B shows a side view of a cap for a biometric input component.

FIG. 5B shows an example of a side view of the cap 556 of FIG. 5A. As shown in FIG. 5B, the cap 556 has a thickness T and a lateral dimension L (e.g., a width or a length of the square shape of FIG. 5A). As examples, the thickness T may be from 100 microns to 750 microns, from 100 microns to 400 microns, or from 200 microns to 500 microns. As examples, the lateral dimension may be from about 0.5 cm to about 5 cm or from about 0.5 cm to 2 cm. The cap 556 of FIG. 5B includes a front surface 572, a side surface 574, and a curved surface 576 which extends between the front surface 572 and the side surface 574. In some cases, a side surface of a cap, such as side surface 574, may simply be referred to herein as a side of a cap. In some embodiments, the rounded or curved surface 576 may be referred to as a rounded edge or corner. The rounded surface 576 may be characterized by a radius of curvature as explained in further detail with respect to the detail view of FIG. 6A and the description of the rounded surface provided with respect to FIG. 6A is generally applicable herein.

Figure 6A:
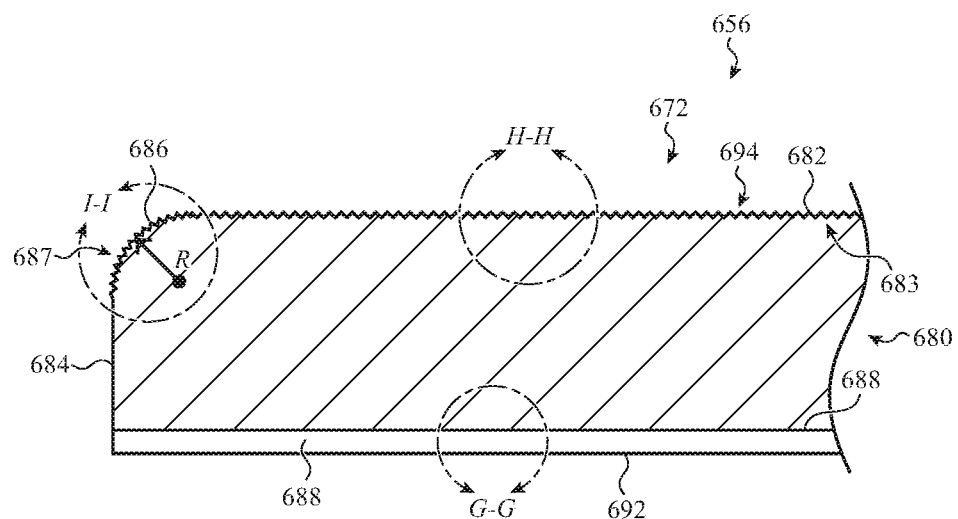
FIG. 6A shows a partial cross-section view of a cap for a biometric input component.

FIG. 6A shows a partial cross-section view of a cap 656 for a biometric input component, such as a biometric button or key. For example, the cross-section may be along E-E in area F-F of FIG. 5A. The cap 656 includes a ceramic cover 680 and may be configured to have a visual and/or tactile property similar to that of an adjacent keycap of the electronic device. As schematically shown in FIG. 6A, a front surface 682 and a curved surface 686 of the ceramic cover 680 are textured. A cover provided over the biometric input component, such as ceramic cover 680, may also be referred to generally herein as a cover member, a cap member, or simply as a member. The cap 656 may be an example of the cap 156 or the cap of any other biometric input key described herein.

The curved surface 686 of the ceramic cover 680 may define a radius of curvature R. In some embodiments, the radius of curvature is from about 0.05 mm to about 0.3 mm, from about 0.05 mm to about 0.2 mm, or from about 0.1 mm to about 0.2 mm. In some cases, the mean radius of curvature is from about 0.05 mm to about 0.3 mm, from about 0.05 mm to about 0.2 mm, from about 0.1 mm to about 0.25 mm, or from about 0.1 mm to about 0.2 mm. The radius of curvature R may vary at least in part due to the texture of the curved surface 686. In some cases, the variation of the radius of curvature along the curved surface is controlled to within 5%, 10%, 15%, 20%, 25%, 30%, 35%, or 40% of a target radius of curvature or a mean radius of curvature. For example, a tolerance of the radius of curvature of the curved edge may be from 0% to 5%, 0% to 10%, 0% to 15%, 0% to 20%, 0% to 25%, 0% to 30%, 0% to 35%, or 0% to 40% of a target radius of curvature. Control of the radius of curvature along the curved surface can help provide a uniform visual appearance to the cap 656. The curved surface 686 extends between the front surface 682 and the side surface 684.

Figure 9:
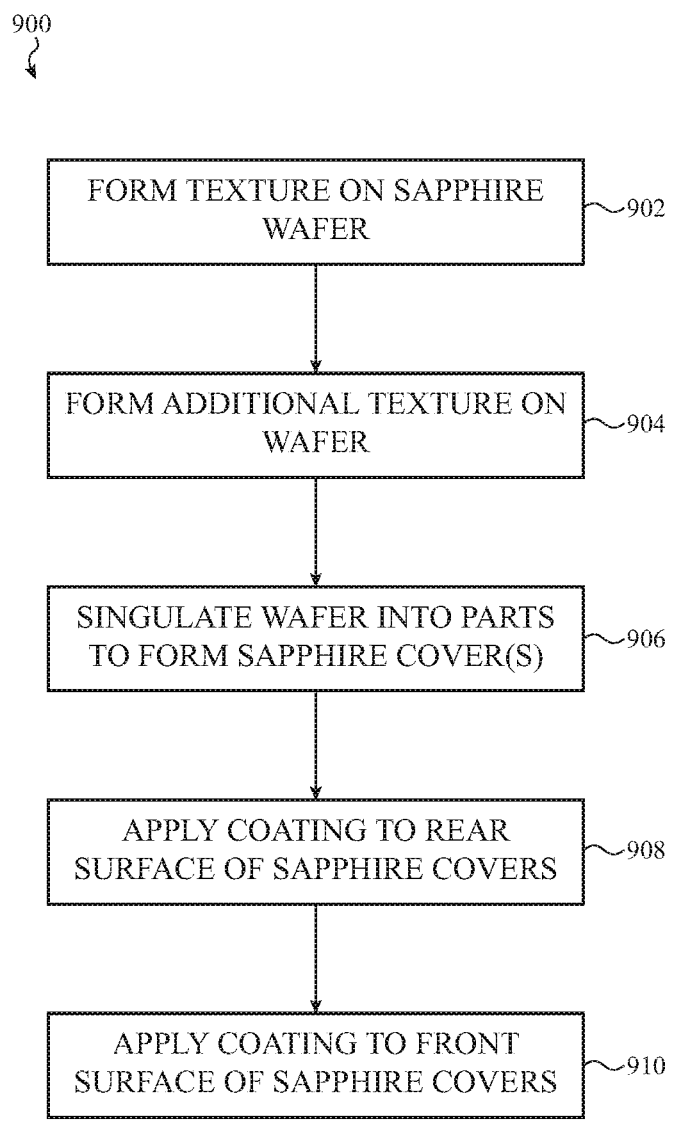
FIG. 9 shows a flow chart of a process for making a textured cap of a biometric input component.

The ceramic cover 680 comprises a ceramic material and may substantially or essentially consist of the ceramic material. The ceramic material may be a dielectric and electrically insulating material. The ceramic material typically transmits visible light (is light transmissive) and in some case may have a transmittance of at least 75%, 80%, or 85% in the visible spectrum. The ceramic material may also be transparent or substantially transparent as polished, as textured, or both. The ceramic material is typically crystalline and may substantially or essentially consist of a single crystal. In some cases, the ceramic material may substantially or essentially consist of single crystal alumina, e.g., single crystal alpha alumina or sapphire. The description of crystal orientations of single crystal sapphire provided with respect to FIG. 9 are generally applicable herein, and, for brevity, are not repeated here. Sapphire may appear substantially transparent and colorless or may include a dopant to provide a desired color cast or tint (e.g., red, orange, yellow, green, blue, violet, or purple).

As shown in FIG. 6A, a rear coating 692 is disposed over a rear surface 688 of the ceramic cover 680. The rear coating 692 may cover the rear surface 688. In some embodiments, the rear coating 692 is configured to give one or more visual properties to the cap 656 and may be referred to as a decorative or cosmetic coating. The rear coating 692 may be configured to absorb one or more wavelengths of visible light, thereby contributing to the perceived color of the cap 656. For example, the rear coating 692 may absorb over a broad band of the visible spectrum and may have a dark appearance.

In some cases, the rear coating 692 may be optically dense. For example, the optical density of the rear coating 692 may be described by $OD=\log_{10}$ (initial intensity/transmitted intensity) and may be greater than or equal to 1, greater than or equal to 2, or greater than or equal to 3, from about 2 to about 5, from about 3 to about 5, or from about 3 to about 4. In some cases, the thickness of the rear coating 692 may be from 0.5 microns to 2.5 microns, from 0.5 microns to 2 microns, from 1 micron to 2 microns, or from 0.5 microns to 1.5 microns. The description provided with respect to FIGS. 6A and 6B is generally applicable herein.

Figure 6B:
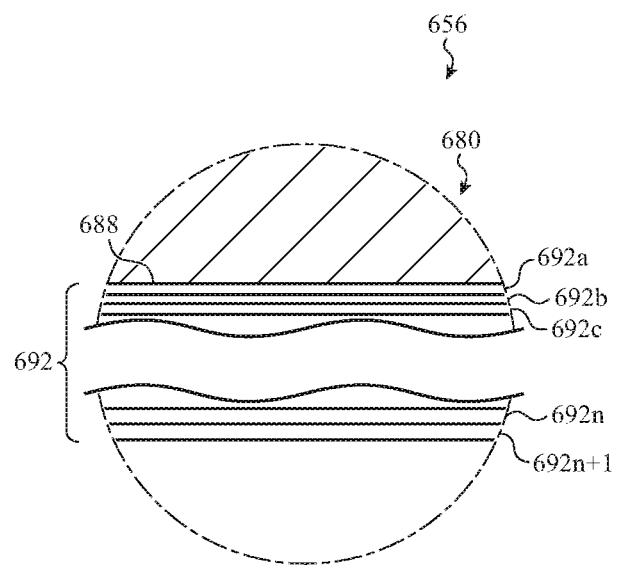
FIG. 6B shows a detail view of the cap of FIG. 6A.

The rear coating 692 may be a multilayer coating comprising multiple layers, as shown in the detail view of FIG. 6B. For example, the rear coating may be an inorganic multilayer coating. In some cases, the inorganic multilayer coating comprises multiple dielectric layers and multiple metal layers and may be referred to as a metal-dielectric coating. Additional description of the rear coating is provided with respect to FIG. 6B and, for brevity, is not repeated here.

The cap 656 also includes a front coating 694 disposed over a front surface 682 of the ceramic cover 680. The front coating 694 may cover the front surface 682. In some cases, the front coating 694 comprises or consists of an anti-reflection coating. For example, the anti-reflection coating may be configured to produce destructive interference of light reflected from the coating and light reflected from the ceramic cover 680 and may thereby provide an anti-reflection effect.

An anti-reflection coating included in front coating 694 may comprise an inorganic dielectric material. For example, the front coating 694 may comprise an oxide (e.g., a metal oxide such as aluminum oxide or a silicon oxide) or a nitride (e.g., a metal or a silicon nitride). The front coating 694 may be a multilayer coating, such as an inorganic multilayer coating. For example, a multilayer anti-reflection coating may have two, three, four, five, six, or more layers. In some embodiments, the anti-reflection coating includes a first layer comprising a first inorganic dielectric material and a second layer comprising a second inorganic dielectric material. The first inorganic dielectric material may have an index of refraction less than an index of refraction of the ceramic cover and the second inorganic dielectric material may have an index of refraction greater than the index of refraction of the ceramic cover. In some cases, the antireflection layer may further include a third inorganic dielectric material different from the first and the second inorganic dielectric materials. For example, the third inorganic dielectric material may have an index of refraction substantially similar to that of the ceramic cover. The additional description of dielectric materials provided with respect to FIG. 9 is generally applicable herein and, for brevity, is not repeated here.

In some cases, the anti-reflection coating may have a thickness from about 50 nm to about 200 nm, from about 75 nm to about 150 nm, from about 50 nm to about 125 nm, or from about 25 nm to about 100 nm. Each layer of the anti-reflection coating may be thin, such as from 1 nm to 200 nm, 5 nm to 150 nm, or from 10 nm to 75 nm. The anti-reflection coating included in the front coating 694 may have a thickness less than an arithmetic mean height (or root mean square height) of surface features defining a texture of the ceramic cover 680. For example, the thickness of the anti-reflection coating may be from about 0.1 to about 0.5 times or from about 0.2 to about 0.5 times the arithmetic mean height (or root mean square height) of the surface features.

Figure 7A:
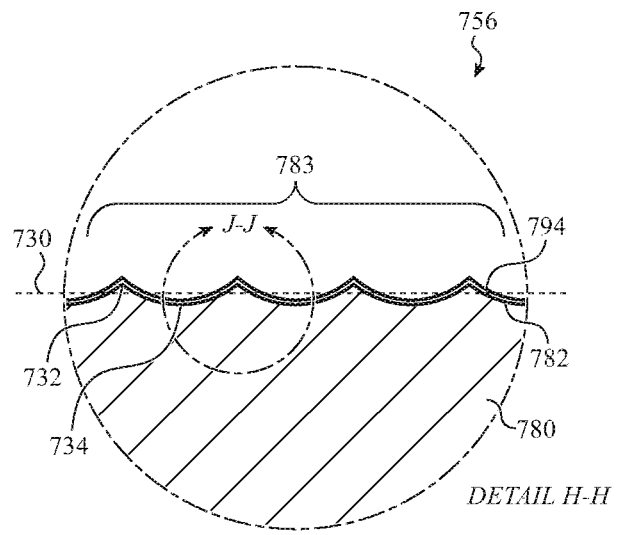
FIG. 7A shows a detail cross-section view of the cap of FIG. 6A.
Figure 7B:
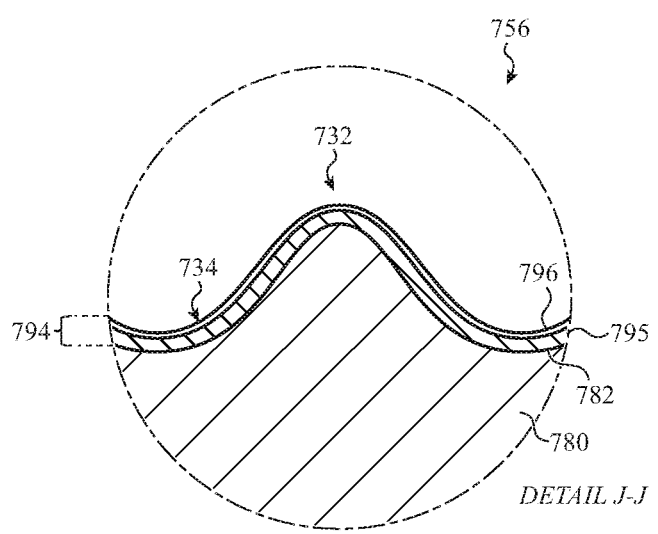
FIG. 7B shows a detail cross-section view of the cap of FIG. 7A.

In some cases, the front coating 694 further includes an anti-smudge coating. The detail view of FIG. 7B shows an example of an anti-smudge coating provided over an anti-reflection coating. In some cases, an anti-smudge coating may comprise a fluorinated material, such as a fluorinated oligomer or polymer, to impart oleophobic and/or hydrophobic properties. For example, the contact angle of an oil on the coating may be greater than or equal to about 65 degrees or about 70 degrees. As an additional example, the contact angle of water on the coating may be greater than or equal to 90 degrees. The fluorinated material may comprise a linear (non-branched) fluorinated molecule such as a linear fluorinated oligomer or a linear fluorinated polymer.

Figure 8:
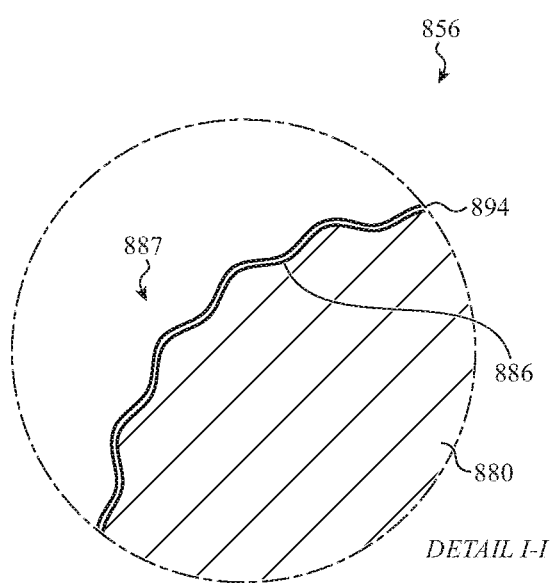
FIG. 8 shows another detail cross-section view of the cap of FIG. 6A.

As shown in FIG. 6A, the front surface 682 of the ceramic cover 680 comprises a plurality of surface features 683 which define a first texture of the ceramic cover. Similarly, the curved surface 686 of the ceramic cover 680 comprises a plurality of surface features 687 which define a second texture of the ceramic cover. In some embodiments, the surface features 683 and 687 are not individually visually perceptible. FIGS. 7A-7B show examples of detail views of surface features on the front surface 682 and FIG. 8 shows an example detail view of surface features on the curved surface 686 of the ceramic cover 680. The description of surface features provided with respect to FIGS. 7A-8 is generally applicable herein and, for brevity, is not repeated here The surface features 683 and 687 may be configured to provide particular optical properties to one or more surfaces of the ceramic cover 680 and to contribute to one or more optical properties of the cap 656. For example, the surface features 683 and 687 may be configured to provide particular values of such optical properties such as gloss to the ceramic cover 680. In some cases, the texture defined by a surface of the ceramic cover 680 may cause the ceramic cover 680 to appear translucent, rather than transparent. A translucent surface of the ceramic cover can more closely resemble the surface of the keycap of another key. In addition, the front coating 694 and/or the rear coating 692, in combination with the textured surfaces of the ceramic cover 680, may be configured to provide particular values of such optical properties such as gloss, reflective haze, reflectance, color, and combinations thereof to the cap 656.

In some cases, the surface features 683 and 687 may be configured to diffusely reflect incident light. The surface features 683 and 687 may define any of a range of shapes or configurations which can diffuse or scatter incident light. For example, the surface features 683 and/or 687 may define protrusions and/or recesses. The surface features 683 and/or 687 may also define sets of hills and valleys. The first texture defined by the surface features 683 and the second texture defined by the surface features 687 may also be configured to diffusely reflect incident light.

A texture of a surface of the ceramic cover 680, such as the first texture of the front surface 682 and/or the second texture of the curved surface 686, may be configured to provide a specified gloss level to the surface. In some embodiments, a textured surface of the ceramic cover 680 may have a gloss value of from about 5 to about 20 or from about 10 to about 20 (in the absence of a rear coating and in the absence of a front coating on the cover 680). Further, the gloss of a textured front surface 672 of the cap 656 (in the presence of a rear coating and a front coating as described herein) may be less than that of the textured surface of the ceramic cover 680. In some cases, the gloss of a textured front surface 672 of the cap 656 may be from about 1 to about 10 or from about 2 to about 8. In some cases, the gloss may be measured using commercially available equipment and according to ASTM or ISO standard test methods. The gloss measurement may be referenced to a particular angle, such as 85 degrees, 60 degrees, or 45 degrees. The angle measurement may refer to the angle between the incident light and perpendicular to the surface.

A textured surface of the ceramic cover 680, such as the front surface 682 and/or the curved surface 686, may be configured to provide a specified level of reflective haze or extent of diffuse reflection (also referred to as the diffuse reflectance) to the corresponding portion of the ceramic cover. In some cases, the reflective haze of a textured surface, such as the front surface 682 of the ceramic cover or the front surface 672 of the cap 656, may be measured using commercially available equipment and according to ASTM or ISO standard test methods. The measurement may use a CIE standard illuminant A or a standard illuminant C. The reflective haze of the front surface 672 of the cap 656 (e.g., with a rear coating and a front coating) may be from about 30 to about 70, from about 35 to about 60, or from about 35 to about 55. As a non-limiting example, the reflective haze or extent of diffuse reflection may be measured using a SMS-1000 available from DM&S (Display-Messtechnik & Systeme). A transmissive haze may also be measured for a textured surface of the ceramic cover 680 (prior to application of an opaque rear coating).

An anti-reflection property of the surface of the cap 656, such as the front surface 672, may be determined from its reflectance spectrum over a specified range of wavelengths, such as the visible spectrum of light (e.g., from about 380 nm to about 780 nm), also referred to as the visible spectrum. A reflectance of a surface of the cap 656, such as the front surface 672 of the cap 656, may be less than about 15%, from greater than or equal to 5% to less than about 15%, less than about 12%, from about 1% to about 15%, or from about 5% to about 12% across the visible spectrum. In comparison, the reflectance of a polished ceramic cover may be greater than that of the surface of the cap, such at least 25%, at least 50%, at least 100%, at least 200%, from 25% to 500%, or from 50% to 500% greater than that of the cap. The reflectance may be measured using commercially available equipment.

In addition, coordinates in CIEL*a*b* (CIELAB) color space may be used to characterize a color of a surface of the cap 656, such as the front surface 672. In CIEL*a*b* (CIELAB) color space, L* represents brightness, a* the position between red/magenta and green, and b* the position between yellow and blue. A broadband or semi-broadband illuminant may be used to determine the color of the surface. For example, a CIE illuminant or other reference illuminant may be used. The color of the surface may be determined from the light reflected at a particular viewing angle (e.g., a viewing angle approximately aligned with or at an angle to the direction of incident light).

In some cases the cap 656 (or the cover assembly) has first color described by a first L* value; at least one keycap of the array of keys has a second color described by a second L* value; and a difference between the first L* value and the second L* value is less than 20, less than 10, less than or equal to 5, or less than or equal to 3, less than or equal to 2, or less than or equal to 1. Similarly, the difference in a*, b*, and/or Delta E may be less than 20, less than 10, less than or equal to 5, less than or equal to 3, less than or equal to 2, or less than or equal to 1. For example, Delta E may be the square root of the sum of the squares of the differences in L*, a*, and b*. Each of the difference in L*, a*, and b* may be within one of the ranges given above. In some cases, the difference in a* may be less than the difference in L* and b*.

A textured surface of the ceramic cover 680, such as the front surface 682 and/or the curved surface 686, may also be configured to provide a specified level of cleanability. For example, the texture may also be configured so that a size of any recessed surface feature is sufficiently large to facilitate cleaning.

Surface texture parameters include areal surface texture parameters such as amplitude parameters, spatial parameters, and hybrid parameters. Surface filtering may be used to exclude surface noise and/or surface waviness before determining the surface texture parameters. In addition, a segmentation technique may be used to determine feature parameters such as the maximum diameter, the minimum diameter, the area, and the perimeter. These parameters may be calculated on the basis of the feature shape as projected onto the reference surface (e.g., a reference plane). Mean values may be determined for a given class of surface features (e.g., hills or valleys). Surface texture parameters and methods for determining these parameters (including filtering and segmentation) are described in more detail in International Organization for Standardization (ISO) standard 25178 (Geometric Product Specifications (GPS)—Surface texture: Areal). These surface texture parameters may be measured using commercially available equipment.

For example, the surface features (e.g., 683 and/or 687) of one or more surfaces of the ceramic cover 680 may be characterized, in part, by the heights of the surface features. The height may be measured with respect to a reference surface, such as the arithmetic mean of the surface (schematically shown by line 730 in FIG. 7A). The heights of the surface features (e.g., 683 and/or 687) may not be uniform, so that the surface features have a distribution of heights. The magnitude of the heights of the surface features (683, 687) may fall in the range from zero to about 1 micron. The surface features 683, 687 may be characterized by the root mean square height Sq or the arithmetic mean height Sa of the surface (also referred to as the arithmetical mean height). The arithmetic mean height of the surface features 683, 687 may be greater than about 100 nm and less than or equal to about 700 nm, from about 150 nm to about 600 nm, from about 200 nm to about 500 nm, or from about 300 nm to about 700 nm.

FIG. 6B shows a detail view of the cap of FIG. 6A. As shown in FIG. 6B, the rear coating 692 is disposed on a rear surface 688 of the ceramic cover 680. In the example of FIG. 6B, the rear coating 692 comprises multiple layers. For simplicity of illustration, FIG. 6B schematically indicates a first set of layers near the rear surface 688 of the cover 680 (e.g., layers 692a, 692b, 692c), a second set of layers near the interior surface of the coating (e.g., layers 692n and 692n+1), and a gap between the first and the second sets of layers. However, more generally, the rear coating 692 may have a lesser or greater number of coating layers than shown in FIG. 6B. For example, the rear coating 692 may include from 1 layer to 100 layers, from 10 layers to 75 layers, or from 20 layers to 50 layers. Each coating layer may be thin, such as from 1 nm to 200 nm, from 1 nm to 150 nm, from 1 nm to 100 nm, from 1 nm to 10 nm, from 1 nm to 5 nm, from 5 nm to 50 nm, from 10 nm to 75 nm, or from 50 nm to 150 nm.

In some embodiments, at least some of the coating layers may vary in composition. For example, the rear coating 692 may include one or more layers of a first material and one or more layers of a second material different than the first material. In some cases, the first material is an inorganic dielectric material and the second material is a metal. The dielectric material may be an oxide material (e.g., a metal oxide or a silicon oxide) or a nitride material (e.g., a metal nitride or a silicon nitride). The metal of the metal layer may comprise or consist essentially of aluminum, chromium, cobalt, gold, molybdenum, nickel, silver, tin, and the like and alloys and combinations thereof. The dielectric layer(s) may be thicker than the metal layer(s). Further, the rear coating 692 may include one or more layers having a third composition different than the first composition and the second composition. In some cases, at least some of the metal layers alternate with dielectric layers in the rear coating 692. For example, each metal layer may be "sandwiched" between dielectric layers (e.g., between layers of a silicon oxide, a silicon nitride, or combinations thereof).

FIG. 7A shows a detail cross-section view of the cap of FIG. 6A. The cap 756 includes a ceramic cover 780 and may be configured to have a visual and/or tactile property similar to that of an adjacent keycap of the electronic device. FIG. 7A may be a detail view of region H-H of FIG. 6A. The cap 756 may be an example of the cap 156 or of any other cap described herein. As shown in FIG. 7A, the front surface 782 of the ceramic cover 780 defines a set of surface features 783. A front coating 794 is disposed over the set of surface features 783.

As shown in FIG. 7A, the front coating 794 may be thin relative to the surface features 783 of the ceramic cover 780. The front coating 794 may include an anti-reflection coating. The description of anti-reflection coatings provided with respect to FIG. 6A is generally applicable herein and, for brevity, will not be repeated here. In some cases, an anti-reflection coating included in the front coating 794 may have a thickness from 50 nm to about 200 nm, from about 75 nm to about 150 nm, from about 50 nm to about 125 nm, or from about 25 nm to about 100 nm. In addition, the anti-reflection coating may have a thickness that is substantially uniform. The ceramic cover 780 may be an example of the ceramic cover 680 or any other ceramic covers described herein. Similarly, the front coating 794 may be an example of the front coating 694 or any front coatings described herein. Details of these ceramic covers and front coatings are applicable to the ceramic cover 780 and front coating 794 and, for brevity, will not be repeated here.

As shown in FIG. 7A, the surface features 783 may define one or more recesses, such as the surface feature 734. A recess may define a minimum point. The surface features 783 may also define one or more protrusions, such as the surface feature 732. A protrusion may define a maximum point. As schematically shown in FIG. 7A, the surface features 783 may define a set of minimum points as well as a set of maximum points. The set of maximum points may also be referred to as a set of peaks. The surface features 783 may define a set of recesses, each recess being positioned between adjacent peaks of the set of peaks. The shapes of the peaks and the valleys are not limited to those schematically shown in FIG. 7A.

In some embodiments, the surface features 783 define a set of hills and valleys. The hills and valleys may be defined using areal texture analysis techniques as previously described with respect to FIG. 6A. The surface feature 732 may generally correspond to a hill feature and the surface feature 734 may generally correspond to a valley feature. In some embodiments, a set of hills and valleys has a substantially uniform spacing between hill features, valley features, or a combination thereof. In additional embodiments, a set of valleys may have a non-uniform or an irregular spacing between hill features and/or valley features.

The heights of the surface features 783 may be measured with respect to a reference surface 730. For example, the heights of the hills may be determined from the maximum points and the heights of the valleys may be determined from the minimum points. In some cases, the reference surface is the arithmetical mean of the surface.

The example of the surface features 783 provided in the cross-sectional view of FIG. 7A is not limiting and in general the surface features 783 may define any of a range of shapes or configurations. The surface features 783 may have a variety of shapes, such as rounded or angular features. As examples, the surface features 783 may define a circular, oval, polygonal, rectangular, or irregular surface contour. Furthermore, the surface features 783 may define protrusions, recesses, or a combination thereof and may have any suitable shape and may be pyramidal, conical, cylindrical, arched, have a curved upper surface or a frustum of a shape such as a cone, and so on.

FIG. 7B shows a detail cross-section view of the cap of FIG. 7A. FIG. 7B may be a detail view of region J-J of FIG. 7A. As shown in FIG. 7B, the front surface 782 of the ceramic cover 780 defines surface features 732 and 734. The front coating 794 includes an anti-reflection coating 795 disposed over the surface features 732 and 734. An anti-smudge coating 796 is disposed over the anti-reflection coating 795.

As shown in FIG. 7B, the anti-smudge coating 796 may be thin relative to the thickness of the anti-reflection coating 795 and the surface features 732,734. In embodiments, the anti-smudge coating 796 comprises a layer of fluorinated material which is from about 5 nm to about 20 nm thick or from about 10 nm to about 50 nm thick. In some cases, the layer of the fluorinated material is bonded directly to the anti-reflection layer. The description of anti-smudge and anti-reflection coatings provided with respect to FIG. 6A is generally applicable herein and, for brevity, will not be repeated here.

FIG. 8 shows another detail cross-section view of the cap of FIG. 6A. The cap 856 includes a ceramic cover 880 and may be configured to have a visual and/or tactile property similar to that of an adjacent keycap of the electronic device. FIG. 8 may be a detail view of region I-I of FIG. 6A. The cap 856 may be an example of the cap 156 or of any other cap described herein. As shown in FIG. 8, the curved surface 886 of the ceramic cover 880 defines a set of surface features 887. A front coating 894 is disposed over the set of surface features 887.

In the examples of FIGS. 8 and 7A, the surface features 887 of the curved surface 886 are not identical to the surface features 783 of the front surface 782. For example, the surface features 887 of the curved surface 886 may differ in shape and/or one or more roughness parameters from the surface features 783 of the front surface 782. In some cases, differences between the surface features 887 of the curved surface 886 and the surface features 783 of the front surface 782 may result from differences in the methods used to form the texture on the curved surface 886 and the front surface 782, as explained in more detail with respect to FIG. 9.

The ceramic cover 880 may be an example of the ceramic cover 680 or any other ceramic covers described herein. Similarly, the front coating 894 may be an example of the front coating 694 or any front coatings described herein. Details of these ceramic covers and front coatings are applicable to the ceramic cover 880 and front coating 894 and, for brevity, will not be repeated here.

FIG. 9 shows a flow chart of an example process 900 for making a textured cap for a biometric input component. The biometric input component may be a biometric button or key. The textured cap includes a textured ceramic cover and may be configured to have a visual and/or tactile property similar to that of an adjacent keycap of the electronic device. The textured cap may include the textured ceramic cover, one or more coatings applied to a rear surface of the ceramic cover, and one or more coatings applied to a textured front surface of the ceramic cover. Although the example of FIG. 9 describes texturing of a sapphire cover, the operations of process 900 may also apply to texturing of covers formed from ceramic materials other than sapphire.

As shown in FIG. 9, the process 900 includes an operation 902 of forming a texture on a sapphire wafer. The sapphire wafer may have a larger lateral dimension than an individual sapphire cover to be formed. Typically, multiple sapphire covers are formed from a single sapphire wafer. Prior to the operation 902, the sapphire wafer may have a surface roughness corresponding to that of a polished surface, such as a Sa of less than about 1nm or less than about 5 nm. The front and/or rear face of the sapphire wafer may have a particular crystal orientation, such a C-plane orientation, an A-plane orientation, an R-plane orientation, an M-plane orientation, or an orientation that is at a specified angle to one of these orientations. In some cases, the front face and the rear face of the sapphire wafer may have a common crystal orientation. The wafer may be thin, such as from 100 microns to 750 microns, from 100 microns to 400 microns, or from 200 microns to 500 microns. The description of sapphire materials provided with respect to FIG. 6A is generally applicable herein and, for brevity, is not repeated here.

In some cases, the texture may be formed on only one of the main faces of the sapphire wafer. For example, the texture may be formed on the main face of the sapphire wafer which will become the front surface of the sapphire cover; this face is referred to herein as the front face of the sapphire wafer. The texture may be formed across a substantial entirety of the front surface of the sapphire wafer.

In some embodiments, the operation 902 may include applying an abrasive treatment to the sapphire wafer, also referred to herein as grit blasting. The abrasive treatment may comprise directing a stream of abrasive particles at the sapphire wafer. When the texture is to be formed on the front face, but not the rear face, of the sapphire wafer, a mask may be used to shield the other rear face (and optionally the side surfaces) of the wafer. The abrasive treatment may be a wet or a dry grit blasting process. The abrasive particles may comprise ceramic particles having an average size ranging from about 10 microns to about 75 microns. The ceramic particles may have a hardness greater than that of alumina (e.g., diamond particles or silicon carbide particles). Following the abrasive treatment, small pits, small fissures, or other such features may be formed along an exterior surface of the sapphire wafer. Typically the sapphire wafer is washed following the abrasive treatment. The sapphire wafer may also be annealed following the abrasive treatment. The annealing temperature may be less than a melting temperature of the sapphire wafer, such as from about 1000° C. to about 1500° C. The sapphire wafer may be annealed under oxidizing conditions, such as in an air atmosphere or an atmosphere comprising a mixture of oxygen with a gas such as nitrogen, argon, and the like, or under inert conditions.

The process 900 further includes an operation 904 of forming an additional texture on the sapphire wafer. In some embodiments, operation 904 forms the additional texture by a method other than abrasive treatment. For example, operation 904 may include laser-texturing the front face of the sapphire wafer. Operation 904 may include directing a sequence of laser pulses onto the front surface of the sapphire wafer. The laser pulses may be formed by a first laser.

The first laser may be operated at a first set of laser conditions. For example, the first laser may produce a wavelength in the infrared range (e.g., having a wavelength from about 1 μm to about 5 μm). The first laser may produce pulses having a duration in the picosecond range, such as from about 1 ps to about 50 ps. The average power of the first laser may be from about 20 W to about 70 W. The repetition rate of the first laser may be from about 100 kHz to about 750 kHz. The scan speed may be varied as desired and, in some embodiments, may be from about 250 mm/s to about 1250 mm/s. The spot size may be from about 10 microns to about 30 microns.

In some cases, each pulse of the laser beam may transfer energy to the sapphire wafer, including an exposure area on the surface of the sapphire wafer and the region of the sapphire wafer within the focal volume of the laser beam. In order to etch the surface of the sapphire wafer, a sufficient amount of energy is transferred to the sapphire wafer along the exposure area to cause ablation of the sapphire wafer. The sapphire wafer may have an ablation threshold, which may be described in terms of the fluence ($J/cm^2$) of the laser.

Ablation of sapphire can form an ablation feature along the surface of the sapphire wafer. An ablation feature formed along a relatively flat surface of a sapphire wafer may include a depression (or crater) in the surface of the ceramic cover. As the surface of the sapphire wafer becomes more rough (e.g., as a result of a previous ablation of the surface), the shape of the ablation features may become less regular. In some cases, operation 904 may also form the curved surface (or rounded edge) of the sapphire cover. In other embodiments, a separate operation, such as a separate laser-ablation operation, may be used to form the curved surface of the sapphire cover.

The process 900 further includes an operation of 906 of singulating (also, separating) the sapphire wafer into parts to form one or more covers. The operation 906 may also form one or more remainder parts of the sapphire wafer (e.g., along the sides of the wafer). The operation 906 may include cutting or breaking the sapphire wafer in one or more specified regions of the sapphire wafer (e.g., a separation region between two parts). Although FIG. 9 illustrates the operation 906 as following the operation 904, this example is not limiting and in some cases the operation 904 may follow the operation 906. In addition, in some cases, the operation 906 may also form the curved surface (or rounded edge) of the sapphire cover.

In some embodiments, the operation 906 may include one or more laser treatment steps. The operation 906 may include an operation of directing a beam from a second laser onto the separation region of the sapphire wafer. As examples, the second laser may be configured to ablate sapphire material in the separation region (e.g., ablation cutting), or may be configured to create filaments/voids in the separation region through non-linear optical effects. In the latter case, the parts may be separated mechanically, or by application of thermal energy, such as from a third laser.

The second laser may be operated at a second set of laser conditions. For example, the second laser may produce a wavelength in the infrared range (e.g., having a wavelength from about 1 μm to about 5 μm). The second laser may produce pulses having a duration in the picosecond range, such as from about 1 ps to about 50 ps. The average power of the second laser may be from about 5 W to about 20 W. The repetition rate of the first laser may be from about 10 kHz to about 75 kHz. The scan speed may be varied as desired and, in some embodiments, may be from about 25 mm/s to about 125 mm/s. The spot size may be from about 2 microns to about 10 microns. The third laser may be operated at a third set of laser conditions. For example, the third laser may be a carbon dioxide laser producing a wavelength in the infrared range (e.g., having a wavelength from about 9 μm to about 11 μm). In some embodiments, the third laser operates in continuous mode rather than pulsed mode.

The process 900 further includes an operation 908 of applying a coating to a rear surface of the cover(s). This coating may also be referred to as a rear coating. In some embodiments, the rear coating is configured to give one or more visual properties to the textured sapphire cover and may be referred to as a decorative or cosmetic coating. As described with respect to FIGS. 6A-6B, the rear coating may be configured to absorb one or more wavelengths of visible light, thereby contributing to the perceived color of the textured sapphire cover. The description of the rear coating provided with respect to FIGS. 6A-6B is generally applicable herein and, for brevity, is not repeated here.

In embodiments, the coating may be applied to the rear surface of the sapphire cover using a physical vapor deposition (PVD) technique. Physical vapor deposition techniques include, but are not limited to, sputtering and evaporation techniques. Physical vapor deposition can be used to deposit layers of different compositions. The layers may be substantially dense (e.g., substantially non-porous). In some cases, the thickness of the rear coating may be from 0.5 microns to 2.5 microns, from 0.5 microns to 2 microns, or from 1 micron to 2 microns.

In some cases, the rear coating may comprise multiple layers as shown in the example of FIG. 6B. For example, the rear coating may include from 1 layer to 100 layers, from 10 layers to 75 layers, or from 20 layers to 50 layers. Each coating layer may be thin, such as from 1 nm to 200 nm, from 1 nm to 150 nm, from 1 nm to 100 nm, from 1 nm to 10 nm, from 1 nm to 5 nm, from 5 nm to 50 nm, from 10 nm to 75 nm, or from 50 nm to 150 nm.

In some embodiments, at least some of the coating layers of the rear coating may vary in composition. For example, the rear coating may include one or more layers of a first material and one or more layers of a second material different than the first material. In some cases, the first material is a inorganic dielectric material and the second material is a metal. The dielectric material may be an oxide material (e.g., a metal oxide or a silicon oxide) or a nitride material (e.g. a metal nitride or a silicon nitride). The metal of the metal layer may comprise or consist essentially of aluminum, chromium, cobalt, gold, molybdenum, nickel, silver, tin, and the like and alloys and combinations thereof. The dielectric layer(s) may be thicker than the metal layer(s). Further, the rear coating may include one or more layers having a third composition different than the first composition and the second composition. For example, the rear coating may include one or more layers of a third material which is a dielectric material different from the first material. The number of layers of the third material may be less than the number of layers of the first material and the second material. In some cases, at least some of the layers of the dielectric material(s) may alternate with the layers of the metal material as previously described with respect to FIG. 6B. Additional description of dielectric compositions is provided below with respect to operation 910 and, for brevity, is not repeated here.

The process 900 further includes an operation 910 of applying a coating to a front surface of the cover(s). For example, operation 910 may include disposing an anti-reflection coating over the front surface of the cover(s). In some cases, an adhesion layer may be applied to the front surface of the cover(s) before the anti-reflection coating is disposed over the front surface. Further, operation 910 typically includes disposing an anti-smudge coating over the front surface of the cover(s). For example, the anti-smudge coating may be applied over the anti-reflection coating. Although FIG. 9 illustrates the operation 910 as following the operation 908, this example is not limiting and in some cases the operation 908 may follow the operation 910 or may be intermediate between two steps of operation 910 (e.g., intermediate between a step of applying an anti-reflection coating and a step of applying an anti-smudge coating).

In some embodiments, an anti-reflection coating and/or an adhesion layer may be applied to the front surface of the sapphire cover using a physical vapor deposition (PVD) technique. Physical vapor deposition techniques include, but are not limited to, sputtering and evaporation techniques. Physical vapor deposition can be used to deposit layers of different compositions.

The anti-reflection coating may comprise an inorganic dielectric material. For example, the anti-reflection coating may comprise an oxide (e.g., a metal or a silicon oxide) or a nitride (e.g., a metal or a silicon nitride). The anti-reflection coating may be a multilayer coating. For example, a multilayer anti-reflection coating may have two, three, four, five, six, or more layers. In some embodiments, the anti-reflection coating includes a first layer comprising a first inorganic dielectric material and a second layer comprising a second inorganic dielectric material. A first inorganic dielectric material may have an index of refraction less than an index of refraction of the ceramic cover and a second inorganic dielectric material may have an index of refraction greater than the index of refraction of the ceramic cover. In some cases, the antireflection layer may further include a third inorganic dielectric material different from the first and the second inorganic dielectric materials.

The anti-reflection coating may have a thickness from about 50 nm to about 200 nm, from about 75 nm to about 150 nm, from about 50 nm to about 125 nm, or from about 25 nm to about 100 nm. Each coating layer may be thin, such as from 1 nm to 200 nm, from 5 nm to 150 nm, from 5 nm to 100 nm, from 5 nm to 75 nm, or from 5 nm to 50 nm. The layers may be substantially dense (e.g., substantially non-porous).

Suitable oxides include, but are not limited to, a silicon oxide (e.g., $SiO_x$ where x may be about 2), aluminum oxide ($Al_2O_3$), niobium oxide (e.g., $Nb_2O_5$), titanium oxide (e.g., $TiO_2$), tantalum oxide (e.g., $Ta_2O_5$), zirconium oxide (e.g., $ZrO_2$), magnesium oxide (e.g., MgO), and the like. Suitable nitrides include, but are not limited to, silicon nitride ($SiN_x$ where x may be greater than zero and less than or equal to about 1.3, $Si_xN_y$ where x may be about 3 and y may be about 4), silicon oxynitride (e.g., $SiO_xN_y$ which may vary in composition between $SiO_2$ and $Si_3N_4$) and the like. The layers of inorganic dielectric material may be substantially transparent to visible light. The description provided herein with respect to silicon and metal oxides, nitrides, and oxynitrides is generally applicable to the dielectric layers described herein, including those included in the coating provided over the rear surface of the ceramic cover.

In some embodiments, an adhesion layer is applied to the front surface of the sapphire cover to enhance adhesion between the sapphire cover and the anti-reflection coating. The adhesion layer may be thin, such as from about 1 nm to about 25 nm, from about 5 nm to about 15 nm, or from about 5 nm to about 10 nm. The adhesion layer may be a metal oxide layer and for example may comprise alumina ($Al_2O_3$), silica ($SiO_2$), or a mixed oxide such as ($AlO_x$—$SiO_y$).

Typically, an anti-smudge coating is applied over the anti-reflection layer. As previously described with respect to FIG. 6B, the anti-smudge coating may have hydrophobic and/or oleophobic properties. The anti-smudge coating may also comprise a fluorinated material. A layer of the fluorinated material may be formed through a wet chemistry method or by a vapor deposition method.

FIG. 10 shows a block diagram of a sample electronic device that can incorporate a biometric input component having a textured cap. The textured cap includes a textured ceramic cover and may be configured to have a visual and/or tactile property similar to that of an adjacent keycap of the electronic device. The biometric input component may be a biometric button or key. The schematic representation depicted in FIG. 10 may correspond to components of the devices depicted in FIGS. 1A-9 as described above. However, FIG. 10 may also more generally represent other types of electronic devices with cap assemblies as described herein.

In embodiments, an electronic device 1000 may include sensors 1020 to provide information regarding configuration and/or orientation of the electronic device in order to control the output of the display. For example, a portion of the display 1008 may be turned off, disabled, or put in a low energy state when all or part of the viewable area of the display 1008 is blocked or substantially obscured. As another example, the display 1008 may be adapted to rotate the display of graphical output based on changes in orientation of the device 1000 (e.g., 100 degrees or 180 degrees) in response to the device 1000 being rotated.

The electronic device 1000 also includes a processor 1006 operably connected with a computer-readable memory 1002. The processor 1006 may be operatively connected to the memory 1002 component via an electronic bus or bridge. The processor 1006 may be implemented as one or more computer processors or microcontrollers configured to perform operations in response to computer-readable instructions. The processor 1006 may include a central processing unit (CPU) of the device 1000. Additionally, and/or alternatively, the processor 1006 may include other electronic circuitry within the device 1000 including application specific integrated chips (ASIC) and other microcontroller devices. The processor 1006 may be configured to perform the functionality described in the examples above.

The memory 1002 may include a variety of types of non-transitory computer-readable storage media, including, for example, read access memory (RAM), read-only memory (ROM), erasable programmable memory (e.g., EPROM and EEPROM), or flash memory. The memory 1002 is configured to store computer-readable instructions, sensor values, and other persistent software elements.

The electronic device 1000 may include control circuitry 1010. The control circuitry 1010 may be implemented in a single control unit and not necessarily as distinct electrical circuit elements. As used herein, "control unit" will be used synonymously with "control circuitry." The control circuitry 1010 may receive signals from the processor 1006 or from other elements of the electronic device 1000.

As shown in FIG. 10, the electronic device 1000 includes a battery 1014 that is configured to provide electrical power to the components of the electronic device 1000. The battery 1014 may include one or more power storage cells that are linked together to provide an internal supply of electrical power. The battery 1014 may be operatively coupled to power management circuitry that is configured to provide appropriate voltage and power levels for individual components or groups of components within the electronic device 1000. The battery 1014, via power management circuitry, may be configured to receive power from an external source, such as an alternating current power outlet. The battery 1014 may store received power so that the electronic device 1000 may operate without connection to an external power source for an extended period of time, which may range from several hours to several days.

In some embodiments, the electronic device 1000 includes one or more input devices 1018. The input device 1018 is a device that is configured to receive input from a user or the environment. The input device 1018 may include, for example, a push button, a touch-activated button, a capacitive touch sensor, a touch screen (e.g., a touch-sensitive display or a force-sensitive display), a capacitive touch button, dial, crown, or the like. In some embodiments, the input device 1018 may provide a dedicated or primary function, including, for example, a power button, volume buttons, home buttons, scroll wheels, and camera buttons.

The device 1000 may also include one or more sensors 1020, such as a force sensor, a capacitive sensor, an accelerometer, a barometer, a gyroscope, a proximity sensor, a light sensor, or the like. The sensors 1020 may be operably coupled to processing circuitry. In some embodiments, the sensors 1020 may detect deformation and/or changes in configuration of the electronic device and be operably coupled to processing circuitry which controls the display based on the sensor signals. In some implementations, output from the sensors 1020 is used to reconfigure the display output to correspond to an orientation or folded/unfolded configuration or state of the device. Example sensors 1020 for this purpose include accelerometers, gyroscopes, magnetometers, and other similar types of position/orientation sensing devices. In addition, the sensors 1020 may include a microphone, an acoustic sensor, a light sensor, an optical facial recognition sensor, or other types of sensing devices.

In some embodiments, the electronic device 1000 includes one or more output devices 1004 configured to provide output to a user. The output device 1004 may include the display 1008 that renders visual information generated by the processor 1006. The output device 1004 may also include one or more speakers to provide audio output. The output device 1004 may also include one or more haptic devices that are configured to produce a haptic or tactile output along an exterior surface of the device 1000.

The display 1008 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1008 is a liquid-crystal display or an electrophoretic ink display, the display 1008 may also include a backlight component that can be controlled to provide variable levels of display brightness. If the display 1008 is an organic light-emitting diode or an organic electroluminescent-type display, the brightness of the display 1008 may be controlled by modifying the electrical signals that are provided to display elements. In addition, information regarding configuration and/or orientation of the electronic device may be used to control the output of the display as described with respect to input devices 1018. In some cases, the display is integrated with a touch and/or force sensor in order to detect touches and/or forces applied along an exterior surface of the device 1000.

The electronic device 1000 may also include a communication port 1012 that is configured to transmit and/or receive signals or electrical communication from an external or separate device. The communication port 1012 may be configured to couple to an external device via a cable, adaptor, or other type of electrical connector. In some embodiments, the communication port 1012 may be used to couple the electronic device 1000 to a host computer.

The electronic device 1000 may also include at least one accessory 1016, such as a camera, a flash for the camera, or other such device. The camera may be part of a camera assembly which may be connected to other parts of the electronic device 1000 such as the control circuitry 1010.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A computing device comprising:
a display;
an upper housing at least partially enclosing the display;
a lower housing rotatably coupled to the upper housing; and
a keyboard at last partially enclosed by the lower housing and comprising:
    a set of keys, each key of the set of keys including a polymeric keycap; and
    a biometric input key comprising:
        a cap having a front surface gloss value from 1 to 10 as measured at 60 degrees and comprising:
            a transparent ceramic cover defining a textured front surface; and
            an opaque coating disposed on a rear surface of the transparent ceramic cover;
        a biometric sensor positioned below the transparent ceramic cover;
        a frame positioned below the biometric sensor; and
        a switch positioned below the frame.

2. The computing device of claim 1, wherein:
the biometric input key further comprises an anti-reflection coating disposed over the textured front surface of the cap and having a thickness from 75 nm to 150 nm; and
the textured front surface defines a surface roughness having an arithmetic mean height (Sa) from 300 nm to 700 nm.

3. The computing device of claim 1, wherein:
the opaque coating has a thickness from 1 micron to 2 microns and comprises multiple dielectric layers and multiple metal layers.

4. The computing device of claim 1, wherein:
the biometric input key further comprises a spring plate positioned below the switch; and
the spring plate is configured to deflect in response to a press input applied to the textured front surface of the cap.

5. The computing device of claim 4, wherein:
the frame defines a set of protrusions; and
each protrusion contacts a respective portion of the spring plate and is configured to apply a force to the spring plate in response to the press input.

6. The computing device of claim 1, wherein:
the biometric input key further comprises a mechanism coupled to the frame;
the mechanism at least partially surrounds the switch; and
the mechanism is configured to articulate in response to a press input applied to the textured front surface of the cap.

7. The computing device of claim 1, wherein the transparent ceramic cover is formed from crystalline alumina.

8. A computing device comprising:
a first portion comprising a first housing and a display positioned within the first housing; and
a second portion comprising a second housing coupled to the first housing with a hinge and a keyboard, the keyboard comprising:
    an array of keys; and
    a biometric power button comprising:
        a cap including:
            a transparent ceramic cover having a textured front surface configured to diffusely reflect light; and
            an inorganic multilayer coating covering a rear surface of the transparent ceramic cover and configured to absorb visible light;
        a biometric sensor positioned below the cap; and
        an electromechanical switch positioned below the biometric sensor and configured to actuate in response to a press on the biometric power button.

9. The computing device of claim 8, wherein:
the biometric sensor is a fingerprint sensor.

10. The computing device of claim 9, wherein the biometric power button further comprises a mechanism configured to:
allow the cap to travel downward in response to the press on the biometric power button; and
allow the cap to travel upward in response to release of the press on the biometric power button.

11. The computing device of claim 10, wherein the mechanism includes a scissors mechanism.

12. The computing device of claim 8, wherein the textured front surface has an arithmetic mean height from 150 nm to 600 nm.

13. The computing device of claim 8, wherein a front surface of the cap has a gloss value from 1 to 10 as measured at 60 degrees.

14. The computing device of claim 13, wherein a front surface of at least one polymeric key has a gloss value from 1 to 10 as measured at 60 degrees.

15. A computing device comprising:
a housing; and
a keyboard at least partially positioned within the housing, the keyboard comprising:
    a set of keys; and
    a biometric button comprising:
        a cap having a reflectance of less than 15% over a visible spectrum and including:
            a sapphire cover defining a textured front surface; and an anti-reflection coating disposed over the textured front surface of the sapphire cover;
a biometric sensor positioned below the cap;
a support positioned below the cap; and
a dome switch positioned below the support and configured to detect a press input applied to the cap.

16. The computing device of claim 15, wherein:
the support is electrically conductive;
the biometric sensor is a capacitance-based sensor; and
the sapphire cover has a gloss value from 5 to 20 as measured at 60 degrees on the textured front surface.

17. The computing device of claim 15, wherein the cap further includes a multilayer inorganic coating disposed over a rear surface of the sapphire cover and having an optical density from 2 to 5.

18. The computing device of claim 17, wherein the reflectance of the cap ranges from 5% to 12% over the visible spectrum.

19. The computing device of claim 17, wherein the cap has an L* value from 20 to 40.

20. The computing device of claim 19, wherein:
the cap has a first color defined by a first L* value;
at least one key of the set of keys has a second color defined by a second L* value; and
a difference between the first L* value and the second L* value is less than 10.

\* \* \* \* \*